(12) United States Patent
Takayama et al.

(10) Patent No.: US 6,567,189 B1
(45) Date of Patent: May 20, 2003

(54) IMAGE READING APPARATUS

(75) Inventors: Tsutomu Takayama, Kawasaki (JP); Yukitoshi Takeuchi, Yokohama (JP); Shoichi Inoue, Chichibu (JP); Yukio Yoshida, Yoshida-machi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/234,303

(22) Filed: Jan. 21, 1999

(30) Foreign Application Priority Data

Jan. 23, 1998 (JP) .......................................... 10-011217
Jun. 30, 1998 (JP) .......................................... 10-184048

(51) Int. Cl.⁷ ................................................ H04N 1/04
(52) U.S. Cl. ...................................... 358/474; 358/497
(58) Field of Search ................................ 358/474, 505, 358/1.5, 497; 250/208.1, 234–236; 348/222, 218, 223, 260

(56) References Cited

U.S. PATENT DOCUMENTS

| | | | |
|---|---|---|---|
| 5,285,294 A | 2/1994 | Takeuchi | 358/474 |
| 5,311,015 A | 5/1994 | Takeuchi | 250/234 |
| 5,500,661 A | 3/1996 | Matsubara et al. | 347/41 |
| 6,100,928 A * | 8/2000 | Hata | 348/296 |
| 6,195,125 B1 * | 2/2001 | Udagawa | 348/222 |

FOREIGN PATENT DOCUMENTS

| | | | |
|---|---|---|---|
| EP | 0573997 A1 | 12/1993 | ............ H04N/3/15 |
| EP | 0758831 A2 | 2/1997 | ............ H04N/5/232 |
| GB | 2250884 A | 6/1992 | ............ H04N/3/15 |
| JP | 7-288825 | 10/1995 | ............ H04N/9/09 |
| JP | 9-98349 | 4/1997 | ............ H04N/5/335 |
| JP | 10-285343 | 10/1998 | ............ H04N/1/04 |

* cited by examiner

*Primary Examiner*—Jerome Grant, II
*Assistant Examiner*—Negussie Worku
(74) *Attorney, Agent, or Firm*—Fitzpatrick, Cella, Harper & Scinto

(57) ABSTRACT

To provide an image reading apparatus provided with a pixel shifting mechanism for shifting an image incoming to a line sensor in a main scanning direction by substantial ½ of a pixel pitch, a scanning mechanism for scanning the line sensor in a sub-scanning direction and a control unit for performing scanning operation two times at a pitch almost equal to the pixel pitch at respective positions shifted to each other in the sub-scanning direction by a value equivalent to substantial ½ of the pixel pitch and causing the pixel shifting mechanism to perform the pixel shifting of ½ of the pixel pitch between first-time sub-scanning and second-time sub-scanning, and an image-signal generating unit for generating an image signal by averaging the pixel data values obtained through the two repetitions of sub-scanning between diagonal-directional adjacent pixels.

18 Claims, 30 Drawing Sheets

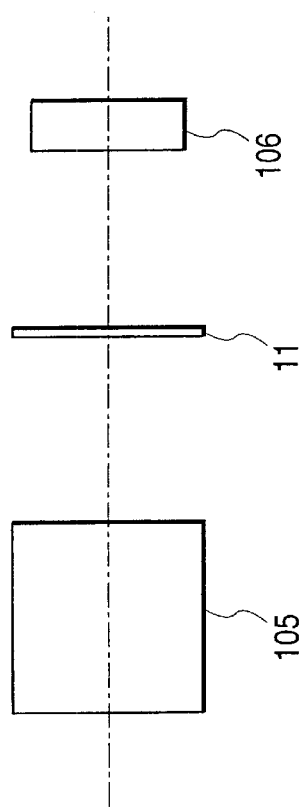
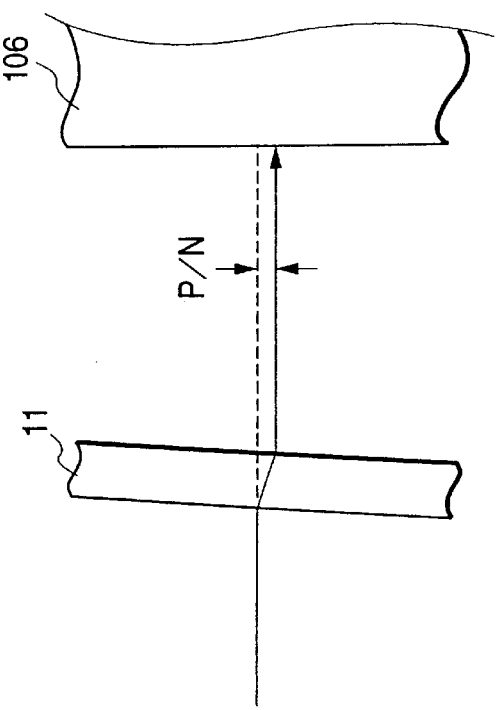
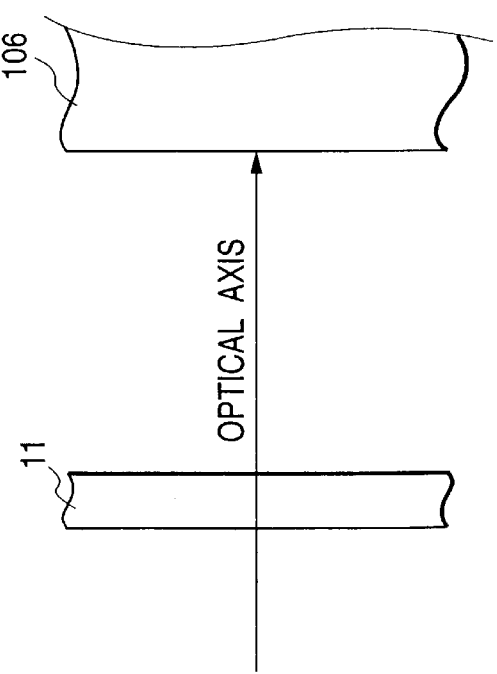

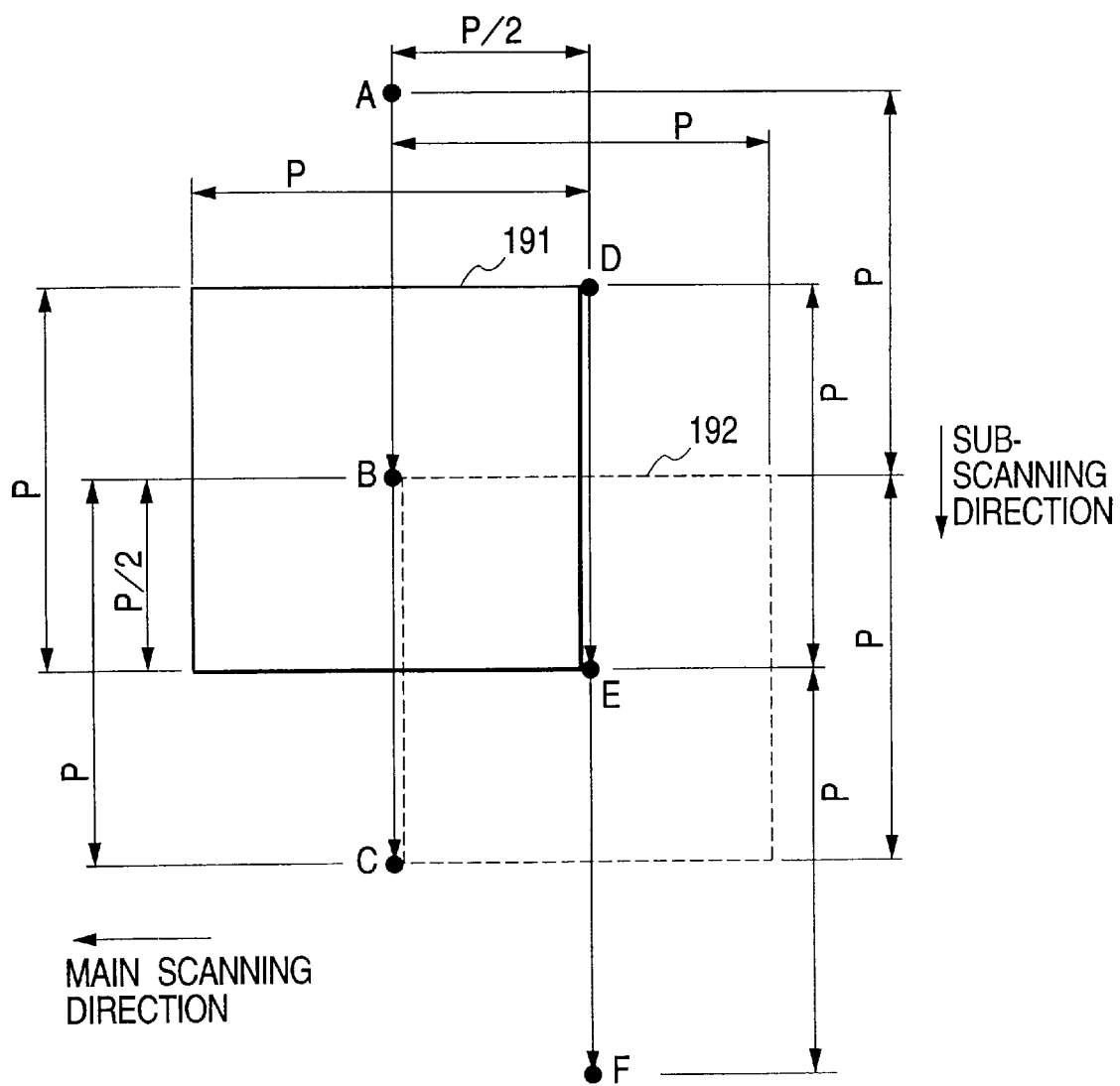

IMAGE READING APPARATUS

BACKGROUND OF THE INVENTION

1. Field of the Invention

The present invention relates to an image reading apparatus and an image reading method.

2. Related Background Art

An image scanner using a CCD linear image sensor (hereafter referred to as CCD) has been known so far as an image reading apparatus.

FIGS. 32A and 32B briefly show the structure of a flat-bed-type scanner, in which FIG. 32A is a top view and FIG. 32B is a side view. Reference D denotes an original to be read put on an original table glass 100. The original is irradiated with a light source 101 and the reflected light is turned back by mirrors 102, 103, and 104 to focus the original on a CCD 106 by a lens 105. The original D is entirely read by moving a reading unit 107 with the light source 101, mirrors 102, 103, and 104, lens 105, and CCD 106 firmly mounted on it from the left to right in FIG. 32A in parallel with the original table glass 100 and thereby scanning the original D to obtain image signals for one page from the CCD 106. In this case, as shown in FIG. 32A, the direction from the top toward the bottom denotes a main scanning direction and the direction from right to left denotes a sub-scanning direction.

FIGS. 33A and 33B briefly show the structure of a CCD. In FIG. 33A, references 201-*a, b, c, d* . . . denote a photoelectric-conversion pixel string of 202-*a, b, c, d* . . . denote carrying gates for carrying electric charges photoelectric-converted by the photoelectric-conversion pixel string of 201-*a, b, c, d, . . .* , 203 denotes a transfer section for successively transferring the carried electric charges, and 204 denotes an output circuit for linearly reading the transferred electric charges as output signals. FIG. 33B shows the photoelectric-conversion pixel portions 201-*a* and 201-*b* in FIG. 33A by enlarging them.

As described above, the original D is linearly illuminated in the main-scanning direction and an optical image focused on the photoelectric-conversion pixel string of 201-*a, b, c, d, . . .* moves in the sub-scanning direction shown in FIG. 33B at a predetermined speed through an optical lens or the like. Electric charges photoelectric-converted by the photoelectric-conversion pixel string of 201-*a, b, c, d, . . .* and accumulated are carried to a transfer section 20 in a predetermined period when the focused image moves from the position A to position B shown in FIG. 33B and then, the focused image is read from the output circuit 204 in a predetermined period when the image moves from the position B to the position C. Hereafter, the above operations are repeated and thereby, a cyclic line sequential signal, that is, a main-scanning line signal is obtained.

Generally, as shown in FIG. 33B, a distance AB (and a distance BC) is set equally to a photoelectric-pixel pitch P in the main-scanning direction so that the same resolution can be obtained in main scanning direction and sub-scanning direction.

In the case of the above conventional example, however, to raise the resolution up to two times, it is necessary to decrease the photoelectric-conversion pixel pitch P to ½. Therefore, the pixel size of the photoelectric-conversion pixel string of 201-*a, b, c, d, . . .* must be decreased to ½ in main scanning direction and sub-scanning direction and the period for the above reading must be also reduced to ½. Therefore, the area of photoelectric conversion pixels is decreased to ¼ and moreover, the time for photoelectric conversion is decreased to ½. Thus, problems occur that the sensitivity is lowered to ⅛ and the image quality is greatly deteriorated.

Moreover, because the transfer rate is doubled, the electric-charge transfer performance is deteriorated and a problem occurs that the heat produced in the transfer section and the power consumption are increased. It is needless to say that these factors deteriorate the image quality of an image reading apparatus. Moreover, because the pixel size decreases, it is necessary to improve the resolution of a lens and thus, the lens cost is increased.

Among the above problems, for the problem of insufficient sensitivity, a method of increasing the size of a photoelectric-conversion pixel and decreasing the focusing magnification of a lens is considered. For example, by increasing the size of photoelectric-conversion pixel up to substantial 2.8 times in main scanning direction and sub-scanning direction, the sensitivity becomes equal to the conventional sensitivity. However, because the size of the transfer section also increases, deterioration of the transfer performance is further progressed and the produced heat is further increased and thus, the image quality is further deteriorated.

Moreover, the chip size in the main-scanning direction is increased up to substantial 2.8 times and thereby, a problem occurs that costs of a CCD and a lens are greatly increased.

SUMMARY OF THE INVENTION

It is an object of the present invention to provide a an image reading apparatus capable of realizing a high image quality equal to two-fold high resolution without changing CCDs or lenses or deteriorating characteristics.

To solve the above problems, according to one aspect of the present invention, there is provided an image reading apparatus comprising optical means for focusing the reflected optical image of an original, an image sensor constituted by linearly arranging pluralities of photoelectric-conversion pixels to accumulate linear reflected optical images focused by the optical means in the photoelectric-conversion pixels as signal electric charges and successively output the linear reflected optical images as image signals every certain period, scanning means for scanning the original in a sub-scanning direction vertical to a main scanning direction serving as the direction of the linear reflected optical images, and pixel-shifting means for shifting the relative positions between the position of an optical image focused on the image sensor through the optical means and the photoelectric-conversion pixels on the unit basis of substantial 1/N (N is an integer) the pixel pitch of the image sensor in the main scanning direction.

Moreover, according to an another aspect of the present invention, there is disclosed an image reading method comprising steps of picking up reflected optical images of an original focused by optical means with a linear image sensor constituted by linearly arranging a plurality of photoelectric-conversion pixels and thereby, successively outputting image signals corresponding to the linear reflected optical images every certain period, shifting the relative positions between the position of an optical image focused on the linear image sensor through the optical means on one hand and the photoelectric-conversion pixels in a main scanning direction on the unit basis of substantial 1/N (N is an integer) the pixel pitch of the linear image sensor every plurality of repetitions of sub-scanning when the original is scanned in a sub-scanning direction vertical to a main scanning direction of the linear reflected optical images, and thereby picking up the original.

Furthermore, according to an another aspect of the present invention, there is disclosed a storage medium storing an image-reading program comprising steps of picking up reflected optical images of an original focused by optical means with a linear image sensor constituted by linearly arranging plurality of photoelectric-conversion pixels to successively output image signals corresponding to the linear reflected optical images every certain period, scanning the original a plurality of times in a sub-scanning direction vertical to a main scanning direction of the linear reflected optical images, shifting the relative positions between the position of an optical image focused on the linear image sensor through the optical means and the photoelectric-conversion pixels in a main scanning direction on the unit basis of substantial 1/N (N is an integer) the pixel pitch of the linear image sensor at every plurality of repetitions of sub-scanning, and synthesizing a plurality of picked-up images.

Furthermore, it is another object of the present invention to provide an image reading apparatus capable of obtaining a high resolution equal to that of an image sensor substantially having the number of pixels two times or more without increasing the number of pixels of the image sensor and preventing the MTF (Modulation Transfer Function) from deteriorating.

To achieve the above object, according to an aspect of the present invention, there is provided an image reading apparatus comprising an image sensor constituted by linearly arranging a plurality of photoelectric-conversion pixels, scanning means for scanning an original in a sub-scanning direction vertical to a main scanning direction serving as the direction of linear reflected optical images incoming into the image sensor, pixel-shifting means for shifting the relative positions between the position of an optical image focused on the image sensor and the photoelectric-conversion pixels by substantial ½ the pixel pitch of the image sensor in a main scanning direction, control means for controlling the scanning means to perform scanning operation two times at a pitch substantially equal to the pixel pitch of the image sensor at respective positions sifted to each other in a sub-scanning direction by a value substantially corresponding to ½ the pixel pitch of the image sensor and controlling the image-shifting means to cause the means to perform pixel shifting of ½ the pixel pitch between first-time sub-scanning and second-time sub-scanning, and image-signal-generating means for generating an image signal by performing the averaging operation between diagonal adjacent pixels for the pixel data for each pixel obtained through the above two repetitions of sub-scanning.

Other objects and features of the present invention will become more apparent from the specification and drawings shown below.

BRIEF DESCRIPTION OF THE DRAWINGS

FIGS. 1A, 1B and 1C are block diagrams when viewing a part of the image reading apparatus of the first embodiment of the present invention from an original table;

FIG. 19 is an illustration showing the arrangement of pixels and relative positions of an optical image of the image reading apparatus of the fourth embodiment of the present invention;

DETAILED DESCRIPTION OF THE PREFERRED EMBODIMENTS

An image reading apparatus of an embodiment of the present invention is described below in detail by referring to the accompanying drawings.

FIG. 1A is a block diagram of a part of the image reading apparatus of the first embodiment of the present invention viewed from the original table side and FIGS. 1B and 1C are,enlarged view of the part.

Reference 11 denotes an optical member made of a glass plate which is inserted into an optical path between a focusing lens 105 and an image pickup device 106 such as a CCD in the case of this embodiment. Structures other than the glass plate 11 of the image reading apparatus are the same as those of a conventional example. Moreover, tilt angles of the glass plate 11 can be changed from the optical axis in a predetermined range.

Operations when performing scanning N times in the case of the above structure are described below. It is assumed that N repetitions of scanning are performed from left to right in FIG. 32B. First, at the first-time scanning, the glass plate 11 is supported vertically to the optical-axis direction as shown in FIG. 1B. Then, at the second-time scanning, the glass plate 11 is slightly tilted to shift the optical axis by 1/N the pixel pitch P on the CCD 106. Therefore, it is necessary to determine the tilt of the glass plate 11 in accordance with the thickness and refraction factor of the glass plate 11 so that the shift value of the optical axis becomes P/N. By slowly increasing the tilt of the glass plate 11 at the third time downward and also increasing the shift value of the optical axis every P/N, the tilt of the glass plate 11 is set so that it is shifted by P(N−1)/N at the Nth time compared to the case of the first time.

In the case of this embodiment, the scanning speed is controlled so that the sub-scanning-directional moving distance every repetition cycle of a line sequential signal for each scanning becomes almost equal to 1/N the pitch between pixels of the CCD 106. Therefore, the number of main-scanning lines for one-time scanning becomes N times larger than the conventional number of main-scanning lines. That is, the number of sampled spaces in the sub-scanning direction becomes N-fold.

Figure 2A:
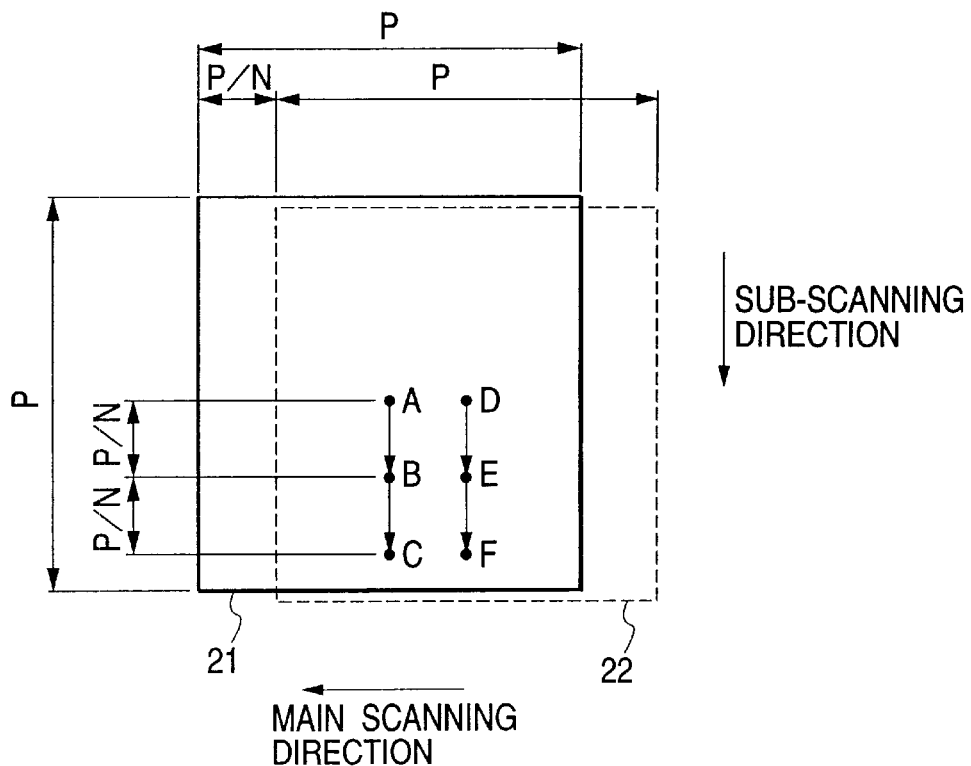
FIGS. 2A and 2B are illustrations showing the arrangement of pixels, movement of an optical image, and arrangement of the pixel data for the image reading apparatus of the first embodiment of the present invention.
Figure 33A:
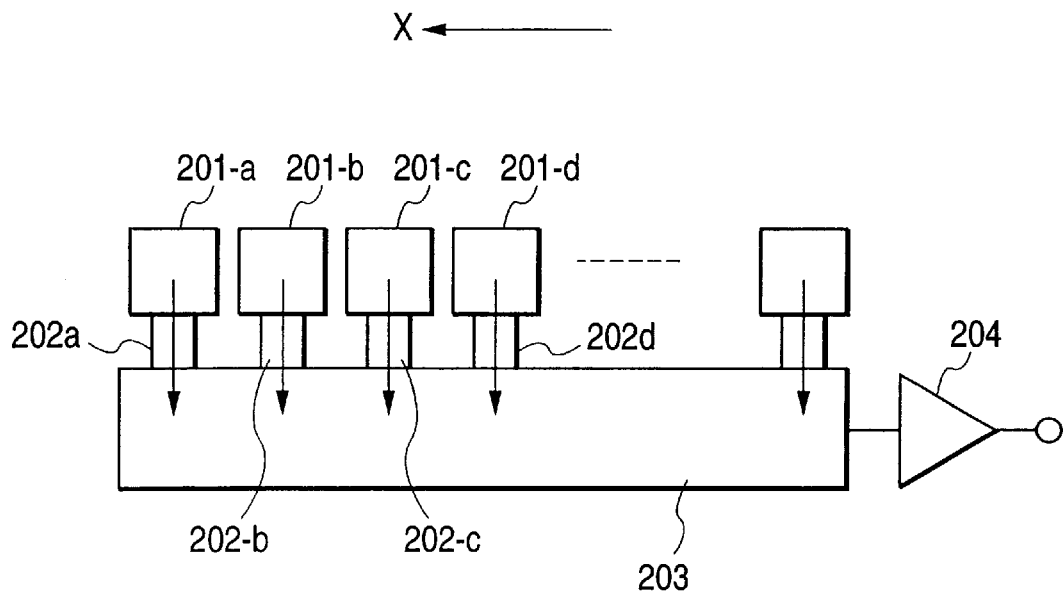
FIGS. 33A and 33B are block diagrams of a CCD linear sensor used for a conventional example.
Figure 33B:
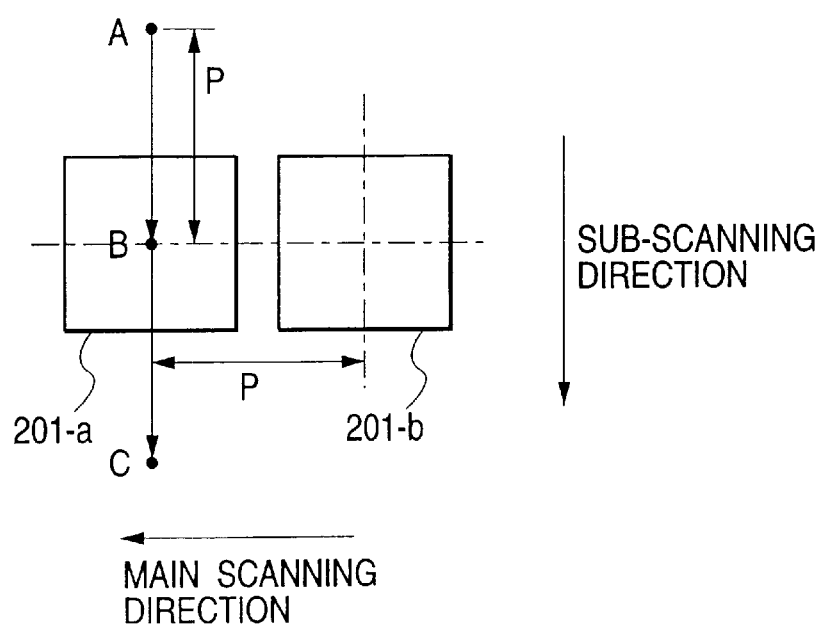

FIG. 2A relatively shows the movement of a pixel position and an optical image to be focused by noticing one photoelectric-conversion pixel shown in FIG. 33B, in which it is assumed that the position of an optical image for each scanning does not move in a main-scanning direction but a pixel position moves. In FIG. 2A, reference 21 shown by a continuous line denotes the xth pixel position in a main-scanning direction on a main-scanning line (this is assumed as the yth line) from the end in a predetermined sub-scanning direction in an image reading range at the first-time scanning and 22 shown by a dashed line denotes the xth pixel position in the main-scanning direction on the yth line at the second-time scanning. The central position of each pixel is shifted by P/N in the main-scanning direction.

The optical image at the central portion of pixels moves from the position A to the position B on the yth line at the first-time scanning while a line sequential signal is repeated and moreover moves from the position B to the position C on the (y+1)th line. Moreover, the optical image moves from the position D to the position E on the yth line at the second-time scanning and moves from the position E to the position F on the (y+1)th line.

Each moving distance is equal to P/N.

Figure 2B:
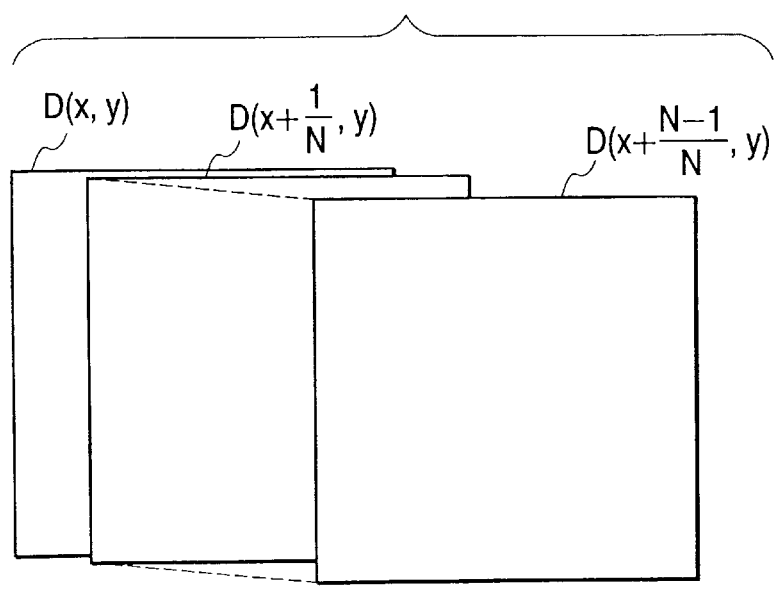

FIG. 2B shows the positions of N pixel data values at the same position at optional time according to the N repetitions of scanning thus obtained, in which the pixel data values are shown as D(x,y), D(x+1/N,y), . . . , and D(x+(N−1)/N,y).

Figure 3A:
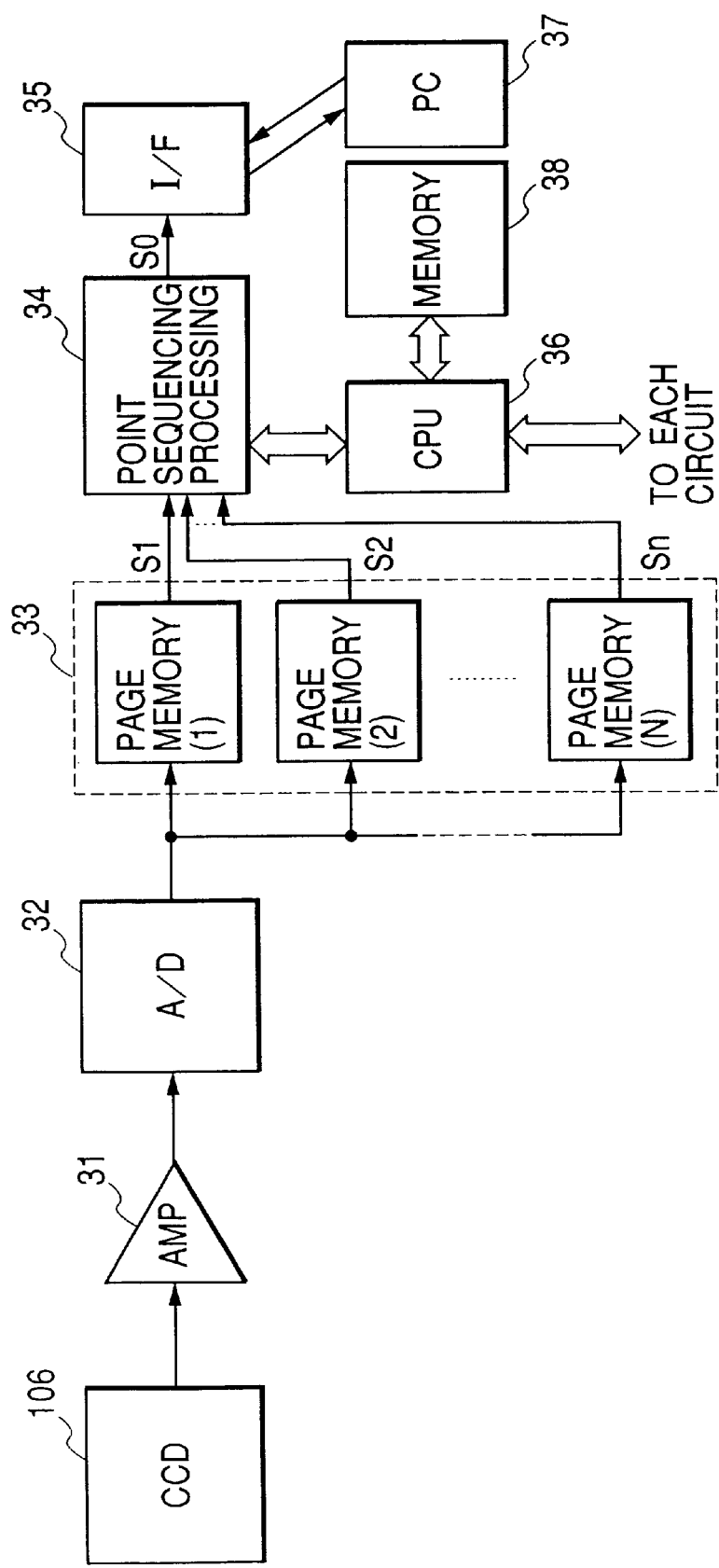
FIGS. 3A and 3B are a circuit block diagram and a signal waveform diagram of the image reading apparatus of the first embodiment of the present invention.

FIG. 3A is a circuit block diagram for processing the image signals obtained through N repetitions of scanning above described as very-minute image signals. Reference 31 denotes a signal amplifier, 32 denotes an A-D converter, and 33 denotes an image memory such as a DRAM which is constituted with N page-memories for the data for N images obtained through N repetitions of scanning. Reference 34 denotes a point sequencing circuit, and 35 denotes an interface (hereafter referred to as IF) circuit for performing data communication with a personal computer (hereafter referred to as PC) 37. The sequence for processing these circuit blocks is controlled by a CPU 36. Moreover, reference 38 denotes a memory (storage medium) storing the processing program of this embodiment by the CPU 36.

Figure 3B:
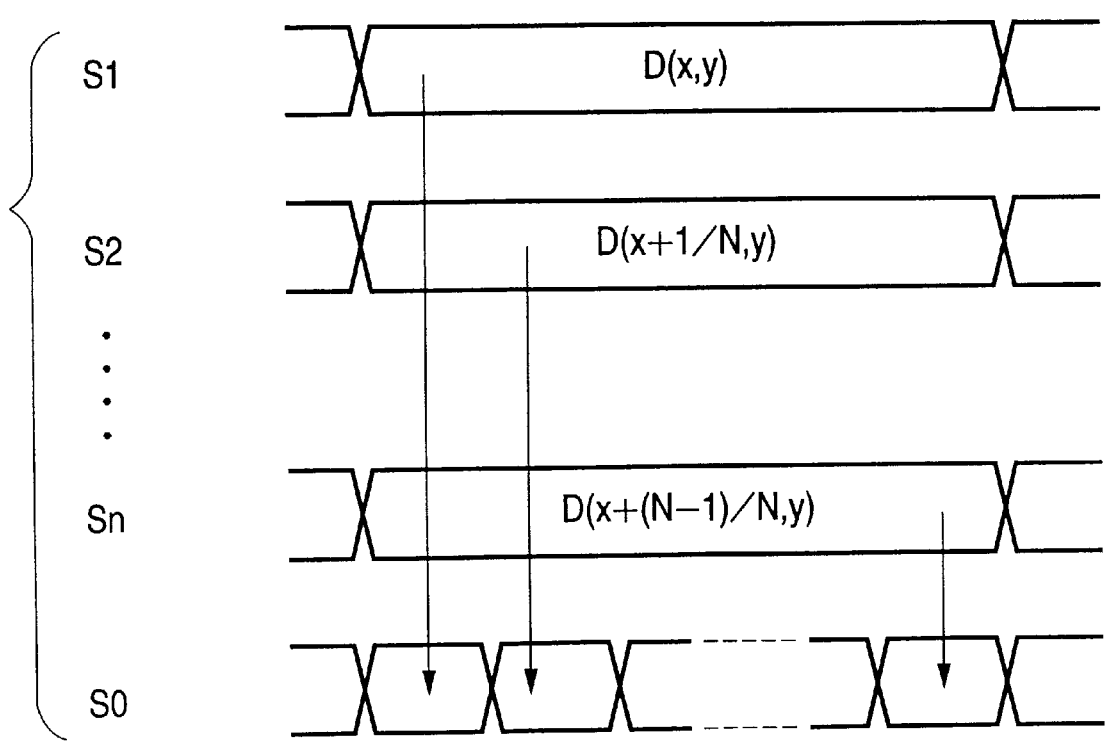

FIG. 3B is a signal waveform diagram showing only one-gradation data of the pixel data string of each circuit block section. Operations of the circuit block in FIG. 3A are described below in detail by referring to FIG. 3B. References S1, S2, . . . , Sn denote outputs of the page memory 33 and S0 denotes the output of the point sequencing circuit 34. In the case of the above structure, image signals obtained from the CCD 106 through N repetitions of scanning are successively stored in the image memory 33 as the image data for N pages. After the image signal in the Nth page is stored, the pixel data values D(x,y), D(x+1/N,y), . . . , and D(x+(N−1)/N,y) at the same position of the image signals S1, S2, . . . , and Sn on each page are successively read and successively arranged by the point sequencing circuit 34 by assuming the pixel data cycle as 1/N to generate the point sequential data value S0. Thus, it is possible to obtain a line sequential signal in which the number of sampled spaces in the main-scanning direction increases up to N times. By repeating the above operation every main scanning lines, it is possible to obtain an image $N^2$ times as minute as a conventional image as the entire number of sampled spaces.

In the case of this embodiment, an image memory is mounted on the image reading apparatus side. However, it is also possible to mount the image memory on the PC 37 side. It can be said that it is more realistic to use a memory or the like built in the PC 37 side. In this case, read and write of data from and in the above memory and the point sequencing are controlled so as to be performed at the PC 37 side.

Then, the MTF (Modulation Transfer Function) of this embodiment is described.

Figure 4:
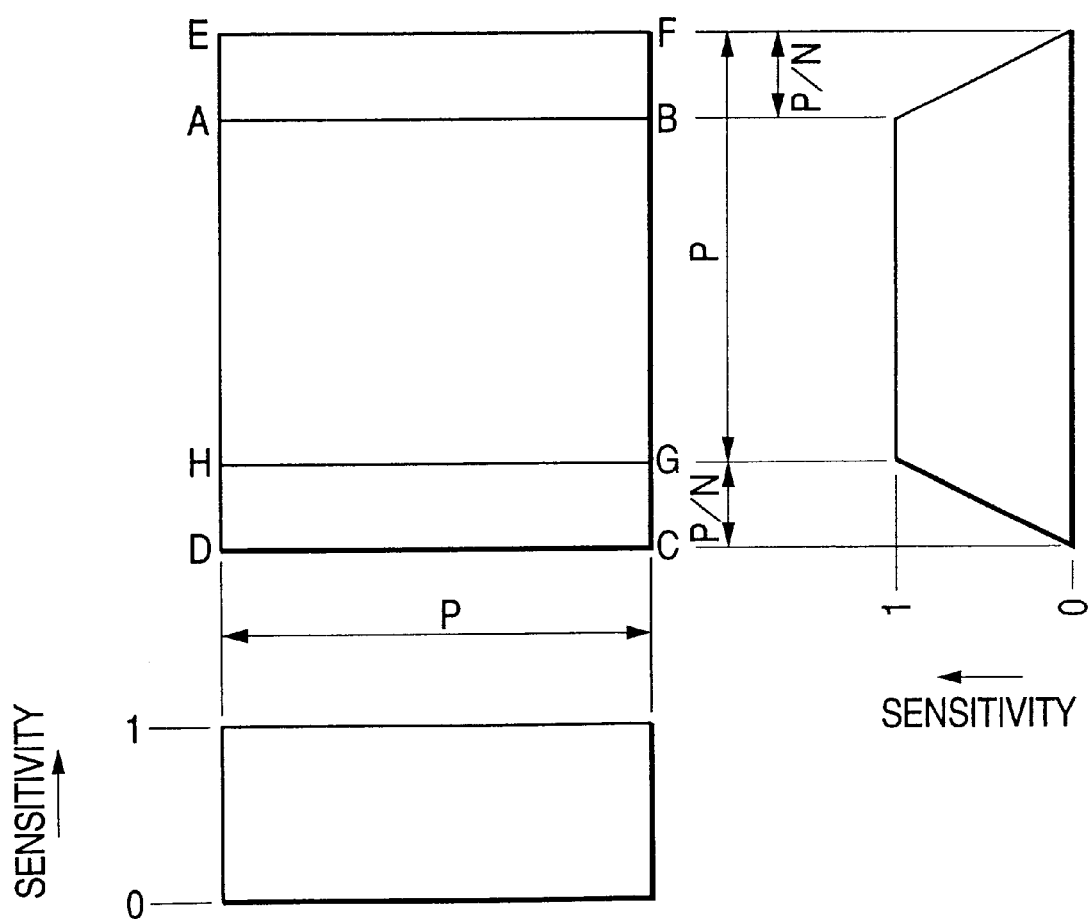
FIG. 4 is a sensitivity distribution map of one pixel of the image reading apparatus of the first embodiment of the present invention.

One photoelectric conversion pixel shown in FIG. 2A is noticed and formed into a square pixel having an opening ratio of 100%. It is assumed that a photoelectric-conversion pixel itself moves by P/N in the direction opposite to a sub-scanning direction instead of the fact that an optical image moves by 1/N the pixel pitch in the sub-scanning direction every repetition cycle of main scanning lines and the three-dimensional sensitivity distribution in the above case is shown in FIG. 4. That is, when it is assumed that a square pixel ABCD with a side length of P moves to EFGH, the sensitivity distribution in a main scanning direction becomes a uniform sensitivity distribution by assuming that a quadrangle ABGH has the maximum sensitivity of "1" and a distribution is formed in which sensitivities from AB toward EF and from GH toward CD are slowly lowered from "1" to "0" at a linear gradient. As the result of obtaining the MTF having the above sensitivity distribution for each direction, the following expressions are obtained.

MTF in main scanning direction=$|(2/\omega P)\sin(\omega P/2)|$

MTF in sub-scanning direction=$|2N(1/\omega P)^2 [\cos\{P(N-1)/2N\}-\cos\{\omega P(N+1)/2N\}]|$ $\omega$: Spatial angular frequency (=$2\pi f$ f: Spatial frequency)

Space sampling is performed N times in one pixel pitch P in main scanning direction and sub-scanning direction. Therefore, when assuming a spatial sampling frequency as fs, the following expression is obtained.

fs=N/P

Therefore, the following expressions are obtained.

MTF in main scanning direction=$|(fs/N\pi f)\sin(N\pi f/fs)|$

Figure 5A:
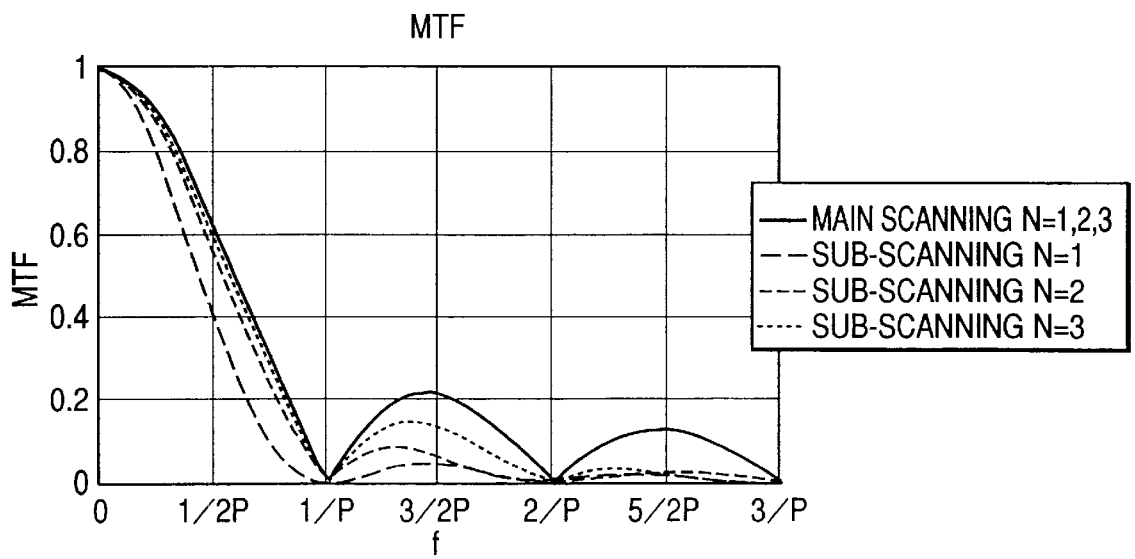
FIGS. 5A and 5B are characteristic diagrams of the CTF and aliasing distortion obtained from FIG. 4.

MTF in sub-scanning direction=$|(1/2N) (fs/\pi f)^2 [\cos\{N-1\}\pi f/fs\}-\cos\{(N+1)\pi f/fs\}]|$ FIG. 5A shows the above expressions graphed for N=1, 2, and 3. From FIG. 5A, it is found that MTFs in a main scanning direction are the same independently of the number of repetitions N of scanning. MTFs in a sub-scanning direction become high little by little as the number of repetitions N of scanning is increased. In the case of spatial frequency bands for F=1/P or less, MTFs become almost equal to the MTFs in the main scanning direction for N=2 or more.

Figure 5B:
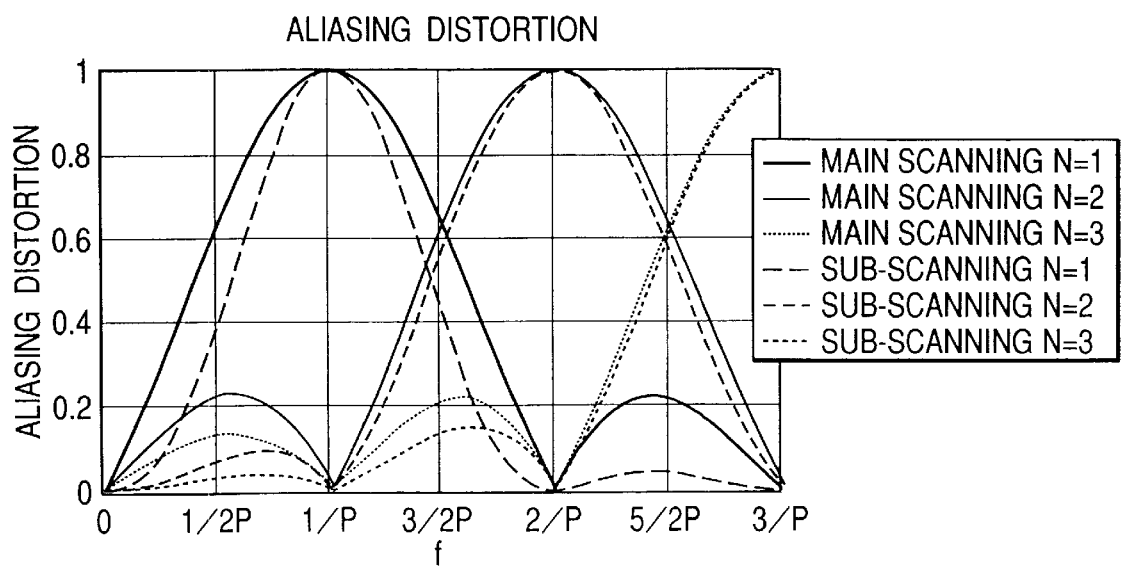

Moreover, it is well known that an aliasing distortion from the sampling frequency fs occurs due to the above spatial sampling. FIG. 5B shows the above mathematical expressions graphed by replacing f with fs-f. From FIG. 5B, it is found that the sampling frequency rises every integral multiples as the number of repetitions of scanning is increased. Therefore, the aliasing distortion in a spatial frequency band for f=1/P or less is greatly decreased in main scanning direction and sub-scanning direction. In general, in the case of the spatial frequency band of an optical image focused on the CCD 106, the high band portion is greatly lowered by the focusing lens 105 or the like and an aliasing distortion produced for f=1/P or more hardly becomes a problem. Therefore, by setting N=2 or more, it is possible to obtain a high-quality image in which an aliasing distortion hardly occurs.

In the case of this embodiment, sub-scanning directions for N repetitions of scanning are the same. However, it is also possible to use a structure in which sub-scanning directions are opposite to each other for the odd-numberth-time scanning and the even-numberth-time scanning. That is, it is possible to use a structure in which scanning is started with the opposite side of an original without returning to the original place whenever scanning is performed. In this case, it is necessary to inversely read the image data at the even-numberth-time scanning in FIG. 3A in a sub-scanning direction. The even-numberth pixel data same as the odd-numberth pixel data D(x,y) is obtained as D(x,z-y) by assuming the total number of scanning lines in an image reading range as z. Thus, it is possible to obtain a high-quality image in which an aliasing distortion hardly occurs in accordance with the point sequencing same as the case of the method above described.

By reversing sub-scanning directions at the odd-numberth time and the even-numberth time, it is possible to decrease the entire read time compared to the case of the first embodiment.

In the case of the first embodiment, the sub-scanning-directional moving distance of scanning means every repetition cycle of a line sequential signal is set to 1/N the pitch P between photoelectric-conversion pixels. However, the second embodiment of the present invention controls the scanning speed so that a sub-scanning-directional distance becomes almost equal to the pitch P between pixels as shown in FIG. 33B. Moreover, the read timing of each line sequential signal is shifted by 1/N the repetition cycle of the line sequential signal so as to shift the position of the optical image of each line sequential signal focused on a CCD through N repetitions of scanning by a value corresponding to substantial 1/N the pitch P between pixels of the CCD in a sub-scanning direction.

Figure 6:
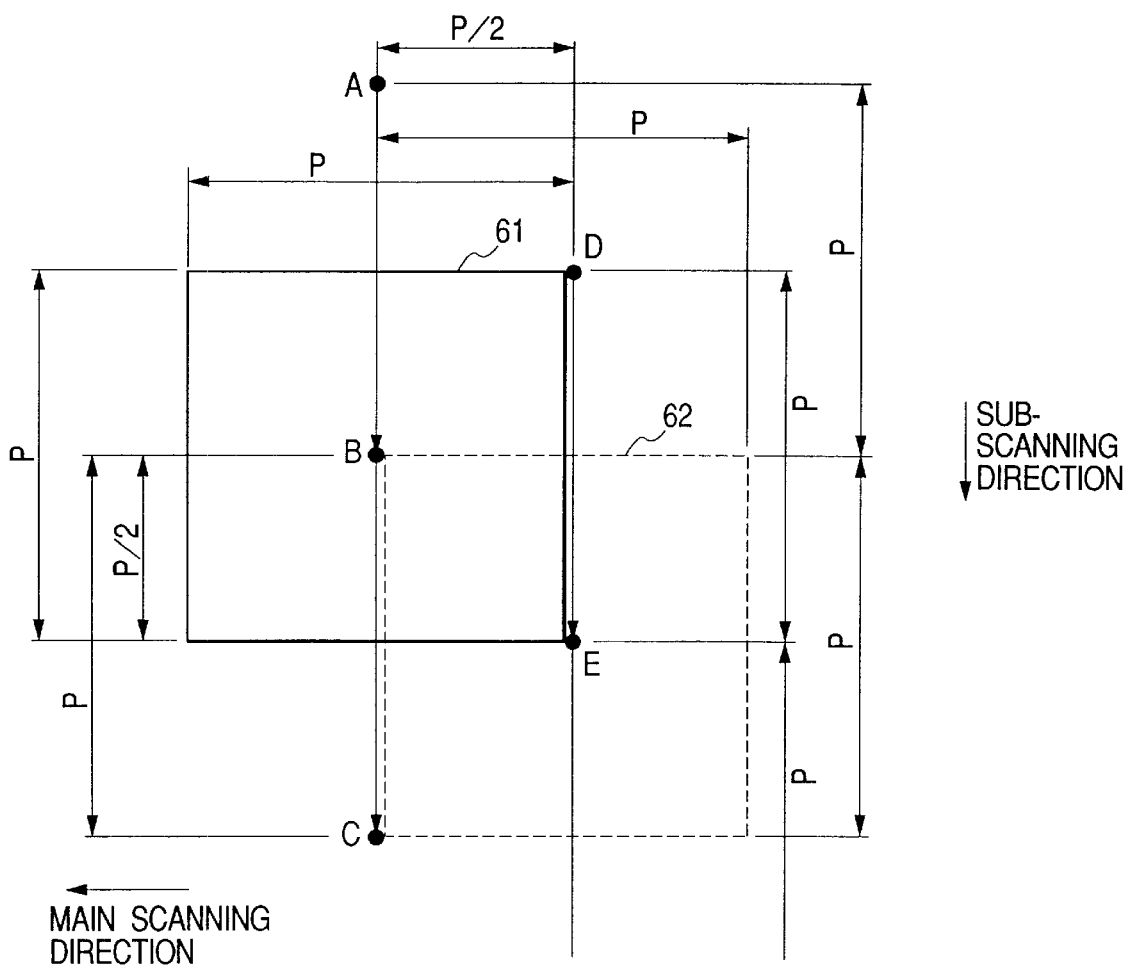
FIG. 6 is an illustration showing the arrangement of pixels and movement of an optical image of the image reading apparatus of the second embodiment of the present invention.

To simplify description, a case of N=2 is described below by referring to FIG. 6. FIG. 6 relatively shows the pixel position and the movement of an optical image to be focused by noticing one photoelectric-conversion pixel, in which it is assumed that the position of the optical image does not move for each scanning but the pixel position moves. In FIG. 6, reference 61 shown by a continuous line denotes the xth pixel position in a main scanning direction on a main scanning line (this is assumed as the yth line) from the end in a predetermined sub-scanning direction in the image reading range at the first-time scanning and 62 shown by a dashed line denotes the xth pixel position in the main scanning direction on the yth line from the end in the above predetermined sub-scanning direction at the second-time scanning, and the central position of each pixel is shifted by P/2 in both the main scanning direction and sub-scanning direction. The central position of the optical image moves from the position A to the position B on the yth line at the first-time scanning and moves from the position B to the position C on the (y+1)th line while a line sequential signal is repeated. Similarly, the central position moves from the position D to the position E on the yth line at the second-time scanning and moves from the position E to the position F on the (y+1)th line. Each moving distance is equal to P.

Therefore, in the case of the above structure, the pixel data at the first-time scanning and the pixel data at the second-time scanning are obtained by space-sampling the positions different from each other by P/2 in main scanning direction and sub-scanning direction.

Figure 7A:
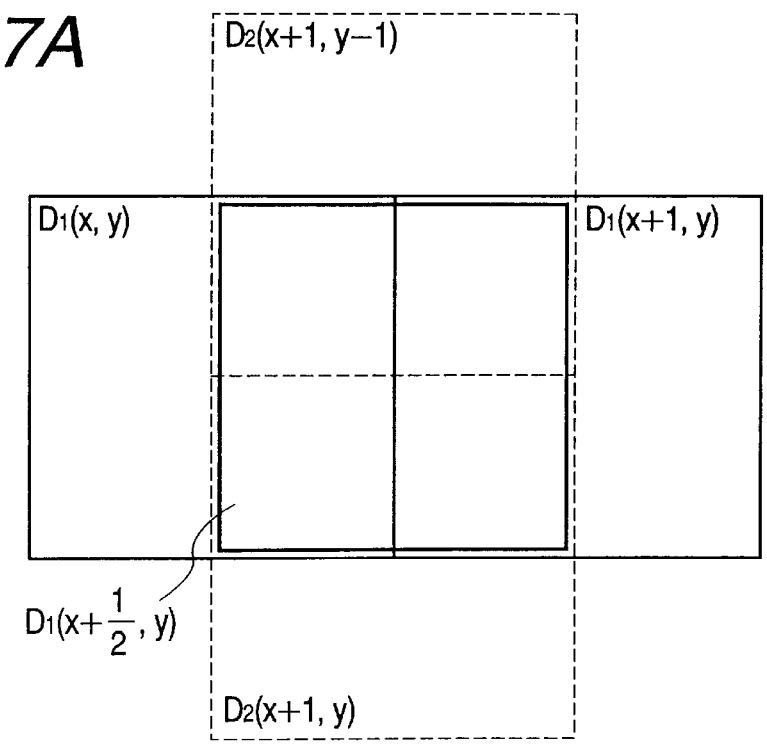
FIGS. 7A and 7B are illustrations showing the arrangement of four pixel data values used for the interpolation of pixel data for two repetitions of scanning in the image reading apparatus of the second embodiment of the present invention.
Figure 7B:
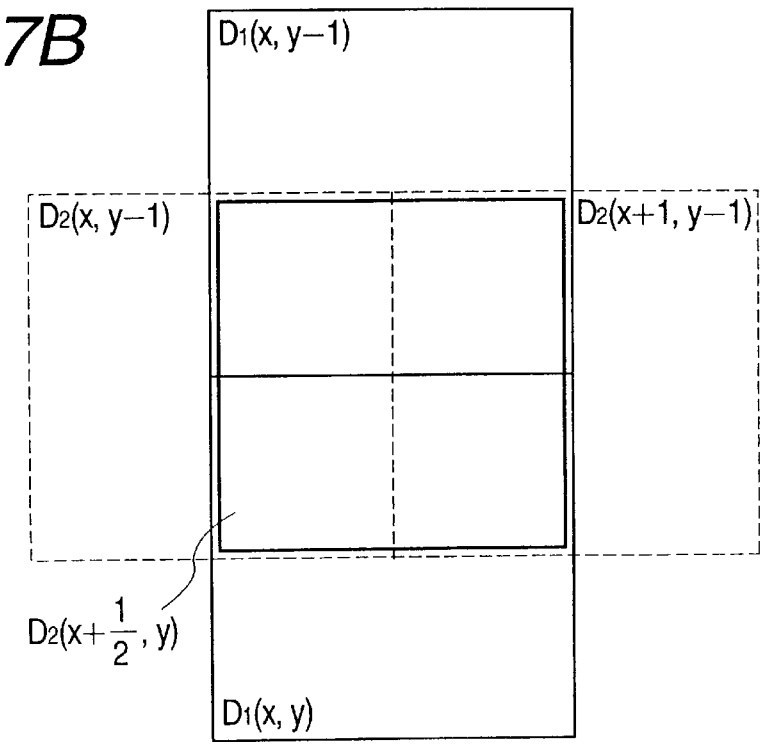

FIGS. 7A and 7B show a method for interpolating the image signal through two repetitions of scanning thus obtained, in which FIG. 7A shows the arrangement of four pixel data values used to interpolate the pixel data at the first scanning and FIG. 7B shows the arrangement of four pixel data values used to interpolate the pixel data at the second scanning. In FIGS. 7A and 7B, a continuous line shows the position of the pixel data at the first scanning and a dashed line shows the position of the pixel data at the second scanning. When it is assumed that the xth pixel data on the yth line at the first scanning is D1(x,y) and the xth pixel data on the yth line at the second scanning is D2(x,y), FIG. 7A shows using the average value of such four pixel data values as the pixel data values D1(x,y) and D1(x+1,y) at the first scanning and the pixel data values D2(x,y) and D2(x,y−1) at the second scanning in order to interpolate the intermediate pixel data value D1(x+1/2,y) between the pixel data values D1(x,y) and D1(x+1,y) at the first scanning. Moreover, FIG. 7B shows using the average value of such four pixel data values as the pixel data values D2(x,y) and D2(x,y−1) and the pixel data values D1(x,y) and D1(x+1,y) at the first scanning in order to interpolate the intermediate pixel data value D2(x+1/2,y) between the pixel data values D2(x−1,y) and D2(x,y) at the second scanning.

Figure 8:
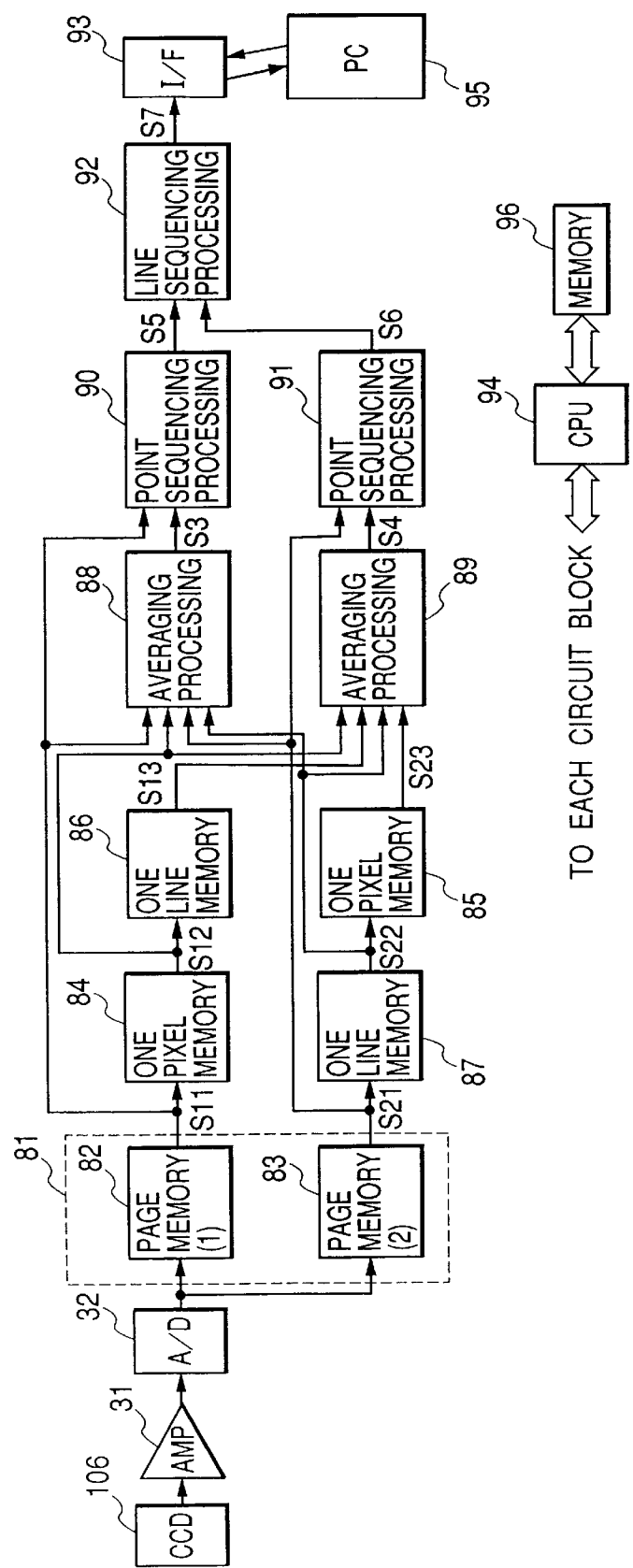
FIG. 8 is a circuit block diagram of the image reading apparatus of the second embodiment of the present invention.

FIG. 8 is a circuit block diagram for interpolating image signals through two repetitions of scanning thus obtained. In FIG. 8, reference 81 denotes an image memory that is constituted with page memories 82 and 83 for the image data obtained through two repetitions of scanning. References 84 and 85 denote one-pixel memories, 86 and 87 denote one-line memories, 88 and 89 denote circuits for averaging four pixel data values, 90 and 91 denote circuits for point-sequencing two pixel data values, and 92 denotes a circuit for sequencing two pixel data strings. Reference 93 denotes an IF circuit for performing data communication with a PC 95 and the sequence for processing these circuit blocks is controlled by a CPU 94. Moreover, a program for control processing by the CPU 94 is stored in a memory 96 (storage medium). However, it is also possible to execute the program by the software at the PC-95 side.

Figure 9:
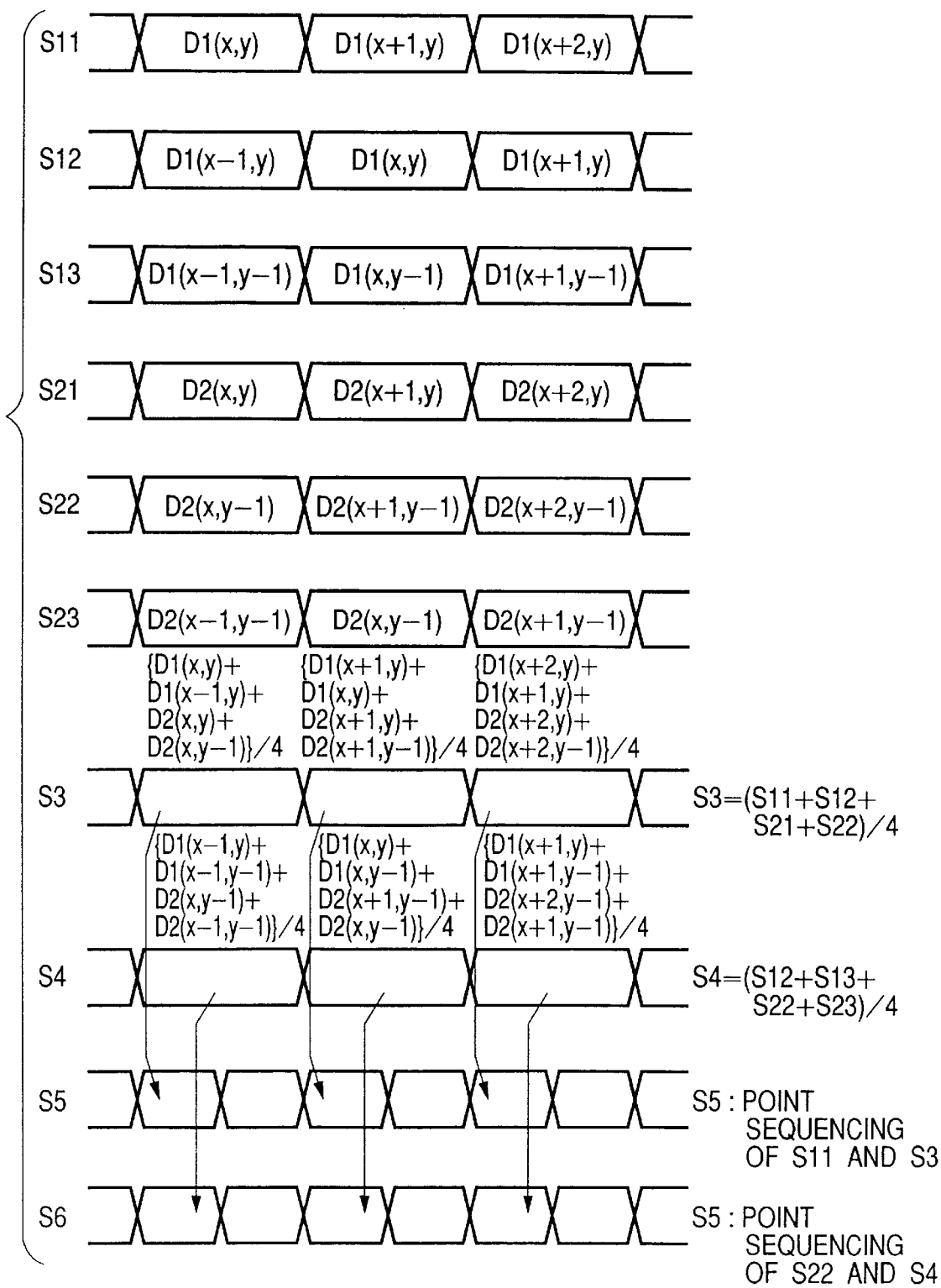
FIG. 9 is a signal waveform diagram for explaining the circuit block diagram in FIG. 8.

FIG. 9 is a signal waveform diagram showing only one-gradation data of the pixel data string of each circuit block section. Operations of a circuit block having the above structure are described below in detail by referring to. FIG. 9. References S11 and S21 denote pixel data strings output from the page memories 82 and 83, S12 denotes an output obtained by passing S11 through the one-pixel memory 84, and S13 denotes an output obtained by passing S12 through the one-line memory 86. Moreover, reference S22 denotes an output obtained by passing S21 through the one-line memory 87 and S23 denotes an output obtained by passing S22 through the one-pixel memory 85. First, to obtain an average value corresponding to FIG. 7A, an average value S3 is computed in accordance with four pixel data strings of S11, S12, S21, and S22 by the averaging circuit 88. Moreover, to obtain an average value corresponding to FIG. 7B, an average value S4 is computed in accordance with four pixel data strings of S12, S13, S22, and S23 by the averaging circuit 89. Then, pixel data values, of S11 and S3 are alternately arranged at a ½ data cycle by the point sequencing circuit 90 to generate S5. Similarly, the pixel-data values of S22 and S4 are alternately arranged by the point sequencing circuit 91 at a ½ data cycle to generate a pixel data string S6. Moreover, the pixel data strings S5 and S6 are alternately output every line by the line sequencing circuit 92 and thereby, a pixel data string S7 having two-fold data content is obtained in main scanning direction and sub-scanning direction.

Then, the sensitivity distribution obtained by averaging four pixel data values in the case of this embodiment is described below.

Figure 10:
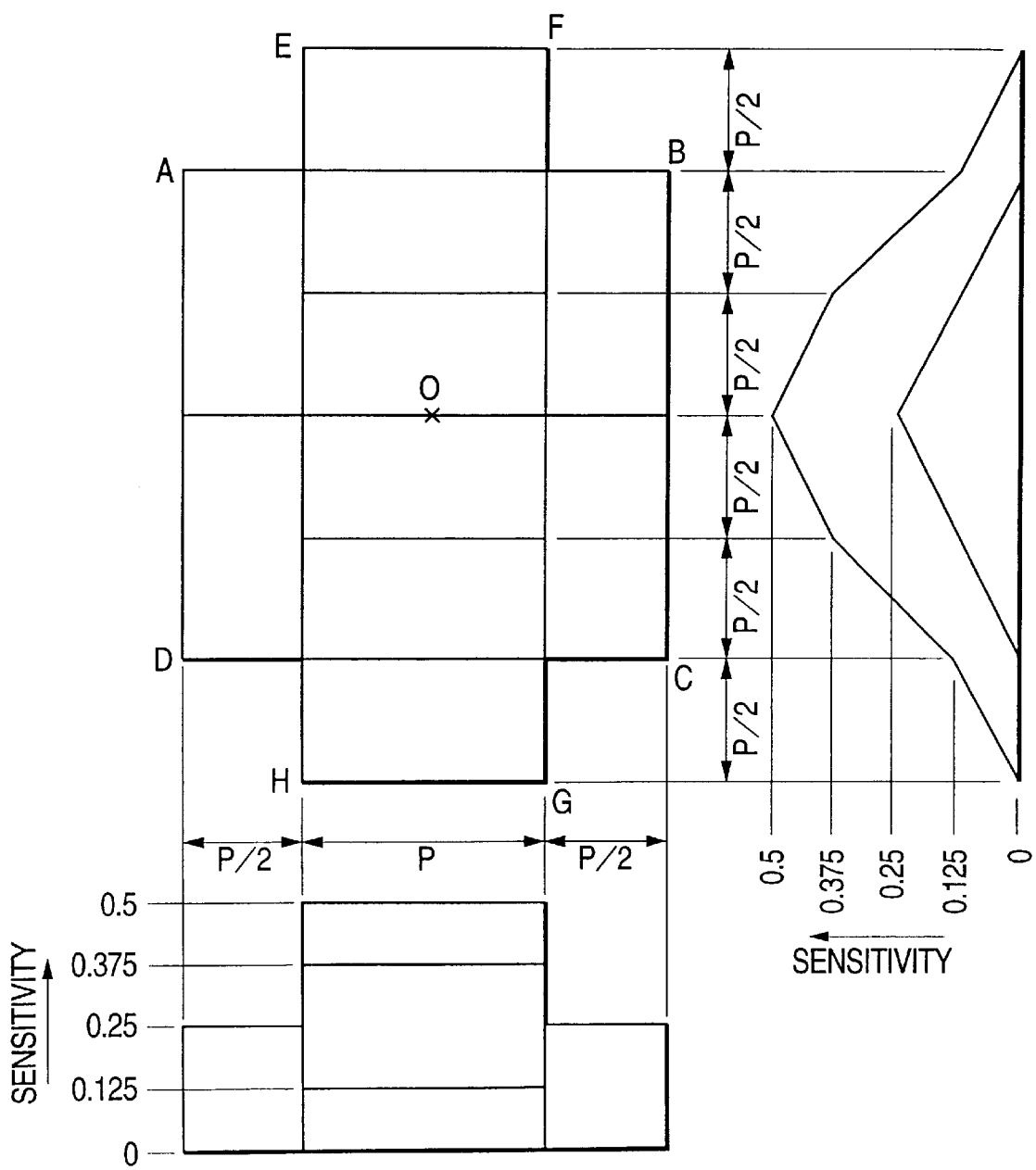
FIG. 10 is a sensitivity distribution map of pixels formed through interpolation of the image reading apparatus of the second embodiment of the present invention.

FIG. 10 shows a three-dimensional sensitivity distribution obtained when noticing the pixel obtained by averaging the four pixel data values shown in FIGS. 7A and 7B. That is, a quadrangle ABCD denotes the sensitivity distribution of two pixels arranged in a main scanning direction and a quadrangle EFGH denotes the sensitivity distribution of two pixels arranged in a sub-scanning direction. From FIG. 10, it is found that, because of using the average value of four pixel data values, the position of the center of gravity of sensitivity is brought into the center O of the square ABCD and quadrangle EFGH and a sensitivity distribution symmetric to the straight line passing through the center O is formed in main scanning direction and sub-scanning direction. In the case of the sensitivity distribution in a main scanning direction, the maximum sensitivity of "0.5" appears between the center O and the distance P/2 on the line of the center O and a sensitivity of "0.25" appears between P/2 and P. In the case of the sensitivity distribution in a sub-scanning direction, the maximum sensitivity of "0.5" appears at the center O on the line of the center O and a sensitivity of "0" appears at a distance of 3P/2 because the sensitivity slowly attenuate as a position goes away from the center. Therefore, sensitivities are distributed in a range wider than the sensitivity distribution formed with only one pixel data value as shown by the case of N=1 in FIG. 4 and the MTF slightly lowers. However, because the aliasing distortion is greatly decreased, it is possible to resultantly obtain a characteristic enough as interpolation data and obtain an image having;a high quality almost equal to the case of the first embodiment.

Figure 11A:
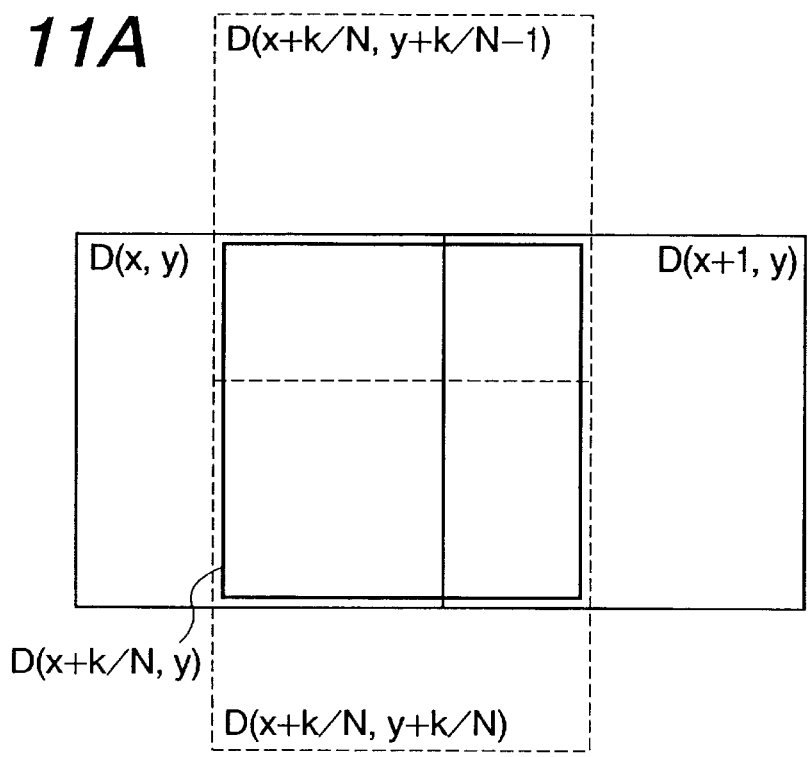
FIGS. 11A and 11B are illustrations showing the arrangement of four pixel data values used for the interpolation at N-repetitions of scanning in the image reading apparatus of the second embodiment of the present invention.

A method for performing the interpolation according to image signals through two repetitions of scanning is described above. Moreover, it is possible to obtain interpolation data from the average of four pixels in the case of N repetitions of scanning. That is, as shown in FIG. 11A, when expressing optional pixel data at any one of N repetitions of scanning as D(x,y) by assuming the pixel data as the xth data on the yth line, it is possible to generate pixel data D(x+k/N,y) by adding the following four pixel data values in order to interpolate the pixel data D(x+k/N,y) which is present between D(x,y) and D(x+1,y) and is shifted from D(x,y) by k/N (k is an integer and k≦N−1) of the pitch between pixels.

(a) Value obtained by multiplying D(x,y) by (N−k)/2N (b) Value obtained by multiplying D(x+1,y) by k/2N (c) Value obtained by multiplying the xth pixel data D(x+k/N−1,y+k/N) on the (y−1)th line by k/2N at the scanning at a position shifted by k/N of the pitch between pixels from the position at the above optional scanning in main scanning direction and sub-scanning direction (d) Value obtained by multiplying the xth pixel data D(x+k/N,y+k/N) on the yth line by (N−k)/2N at the same scanning as that in the above Item (c)

That is, a magnification factor to be multiplied to each value is set so as to be inversely proportional to the distance from D(x+k/N,y).

Figure 11B:
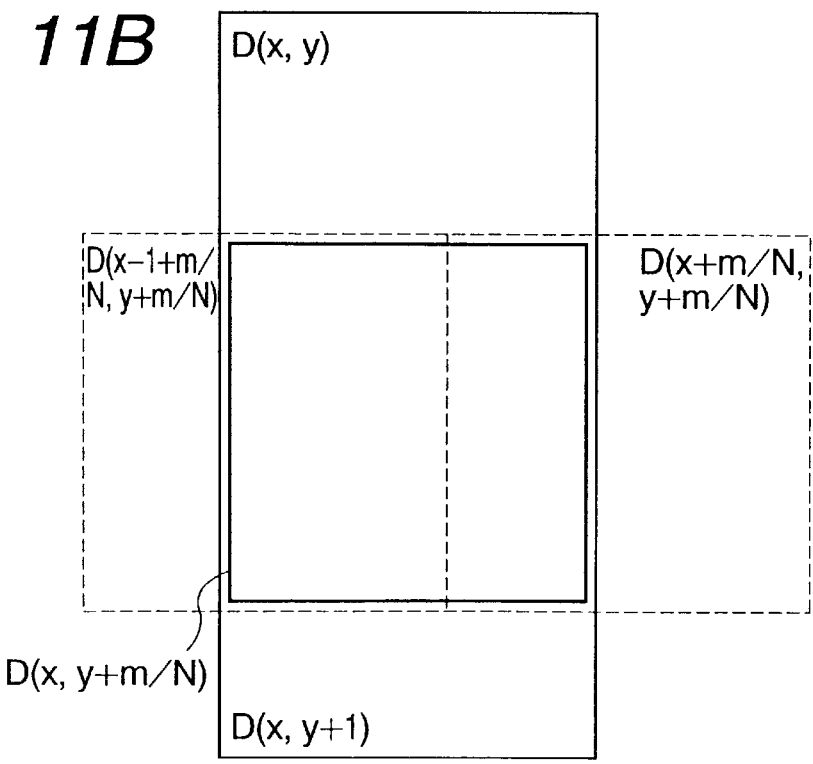

Moreover, as shown in FIG. 11B, to interpolate the pixel data (x,y+m/N) which is present between D(x,y) and D(x, y+1) and is shifted from D(x,y) by m/N (m is an integer and m≦N−1) of the pitch between pixels, it is possible to generate the pixel data (x,y+m/N) by adding the following four pixel data values.

(e) Value obtained by multiplying D(x,y) by (N−m)/N (f) Value obtained by multiplying D(x,y+1)by m/N (g) Value obtained by multiplying the (x−1)th pixel data D(x−1+m/N,y+m/N) on the yth line by m/2N at the scanning at a position shifted from the above scanning by m/N of the pitch between pixels in main scanning direction and sub-scanning direction (h) Value obtained by multiplying the xth pixel data D(x+m/N,y+m/N) on the yth line by (N−m)/2N at the scanning same as that in the above Item (g).

Also in this case, a magnification factor to be multiplied to each value is set so as to be inversely proportional to the distance from D(x,y+m/N).

As described above, in the case of this embodiment, it is possible to obtain an image quality almost equal to the case of the first embodiment while setting the scanning speed in a sub-scanning direction to a conventional value. Therefore, it is possible to greatly reduce the entire scanning time compared to the case of the first embodiment.

The third embodiment of the present invention is constituted so that the sub-scanning-direction moving distance of scanning means every repetition cycle of a line sequential signal is set to 1/N, the pitch P between photoelectric-conversion pixels and pixels are shifted every almost P/N by pixel-shifting means every repetition cycle of the line sequential signal in a main scanning direction.

Figure 12:
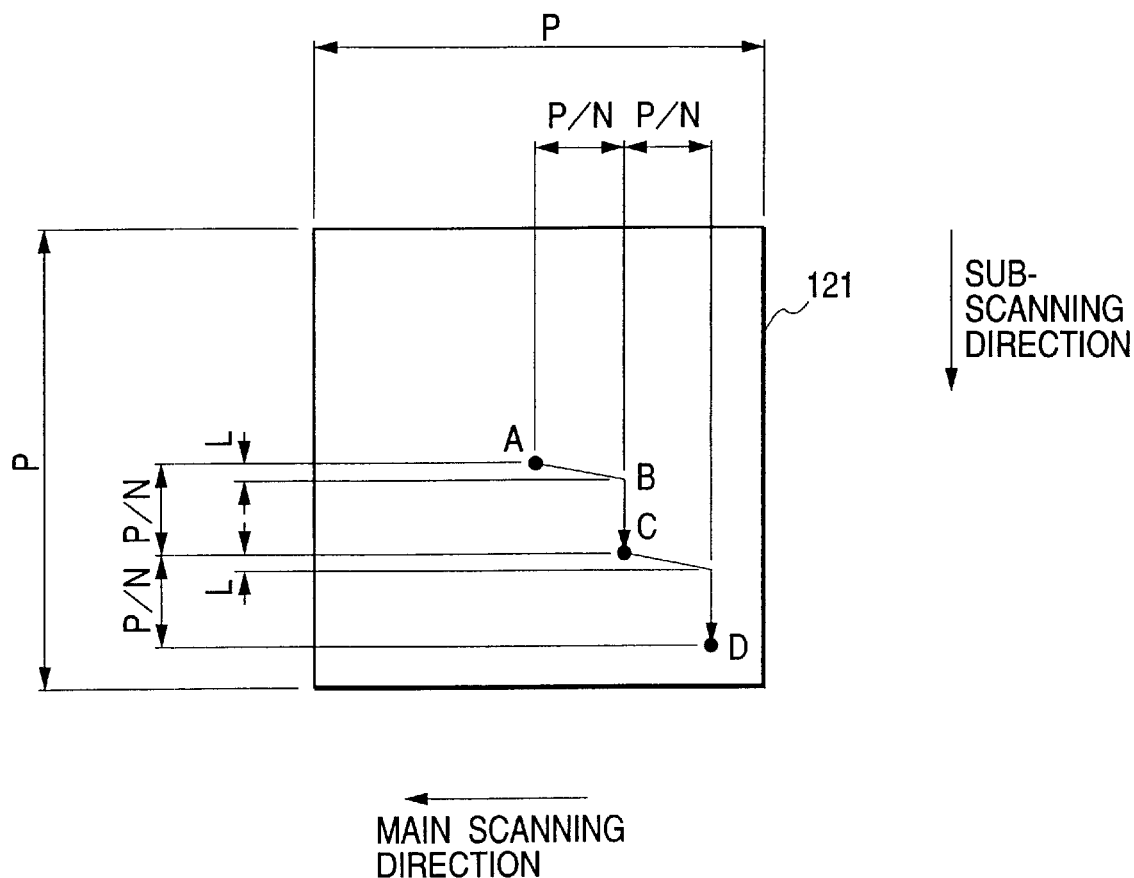
FIG. 12 is an illustration showing pixel positions and movement of an optical image of the image reading apparatus of the third embodiment of the present invention.

Operations of the above structure are described below by referring to FIG. 12. FIG. 12 relatively shows the pixel position and the movement of an optical image to be focused by noticing one photoelectric-conversion pixel, in which reference 121 denotes a pixel position on an optional main scanning line. The optical image focused on the central position A of the pixel 121 at the beginning is first moved to the position B by pixel-shifting means in accordance with the scanning in a sub-scanning direction under the repetition cycle of a line sequential signal and then, moved from the position B to the position C. The distance from the position A up to the position C in a sub-scanning direction is equal to P/N. Moreover, the distance from the position A up to the position B moved by the main-scanning-directional pixel-shifting means is equal to P/N.

In this case, the distance L in the congestion direction from the position A up to the position B is proportional to the moving time of an optical image by the pixel-shifting means. When the moving time is short enough compared to the repetition cycle of a line sequential signal, the sensitivity distribution of the pixel 121 in one cycle of the ling sequential signal becomes equal to that in FIG. 4 even if signal electric charges photoelectric-converted by the pixel 121 and accumulated are directly output in the period from the position A up to the position C. Therefore, it is possible to obtain an image signal having a very small aliasing distortion same as that shown in FIGS. 5A and 5B from the pixel 121.

Figure 13:
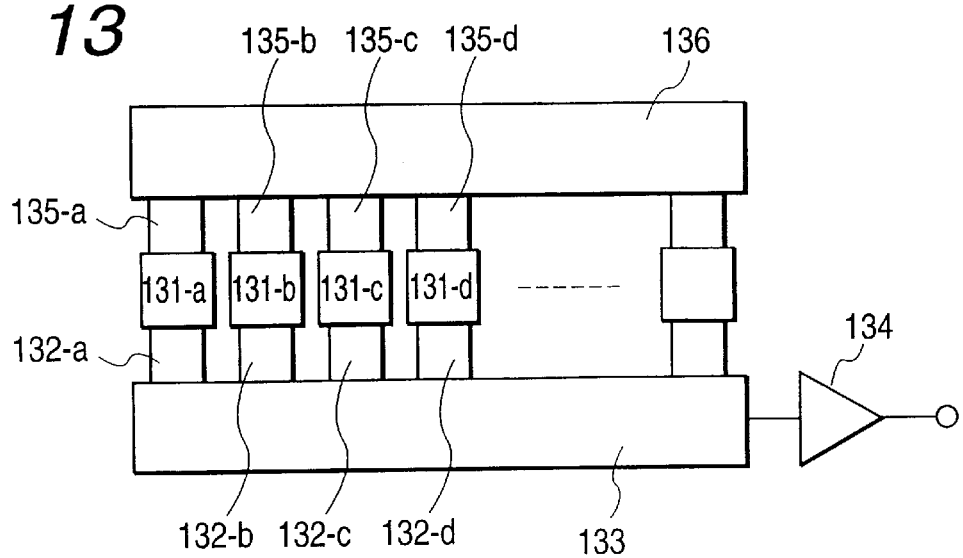
FIG. 13 is a block diagram of a CCD linear image sensor used for the third embodiment of the present invention.

However, when the moving time of an optical image by the pixel-shifting means cannot be ignored compared to the repetition cycle of a line sequential signal, it is possible to sweep away the signal electric charges photoelectric-converted by the pixel 121 and accumulated during the period from the position A up to the position B. FIG. 13 shows an example of a structure of a CCD linear image sensor suitable for the above purpose. In FIG. 13, references 131-*a, b, c, d*, . . . denote a photoelectric-conversion pixel string in which photoelectric conversion pixels are one-dimensionally arranged at equal intervals, references 132-*a, b, c, d*, . . . . and 135-*a, b, c, d*, . . . are carrying gates for carrying electric charges photoelectric-converted by a photoelectric-conversion pixel string of 131-*a, b, c, d*, . . . , 133 denotes a transfer section for successively transferring the electric charges carried by the carrying gates 132-*a, b, c, d*, . . . , 134 denotes an output circuit for linearly reading the transferred electric charges as output signals, and 136 denotes a drain for wearing out the electric charges carried by the carrying gates 135-*a, b, c, d*, . . . .

In the case of the above structure, electric charges photoelectric-converted by the photoelectric-conversion pixel string of 131-*a, b, c, d*, . . . during the period from the position A up to the position B in FIG. 12 are swept away into a drain 135 by turning on the carrying gates 135-*a, b, c, d* . . . . Thereafter, the carrying gates 135-*a, b, c, d*, . . . are turned off to carry the electric charges photoelectric-converted by the photoelectric-conversion pixel string of 131-*a, b, c, d*, . . . during the period from the position B up, to the position C by turning on the carrying gates 132-*a, b, c, d*, . . . thereby carrying to the transfer gate 133 and output the electric charges through the output circuit 134. By repeating the above operations hereafter, it is possible to obtain line sequential signals not including the electric charges accumulated while an optical image is moved by the pixel-shifting means and thereby, the pixel sensitivity distribution in the above case also becomes almost equal to that in FIG. 4.

Figure 14:
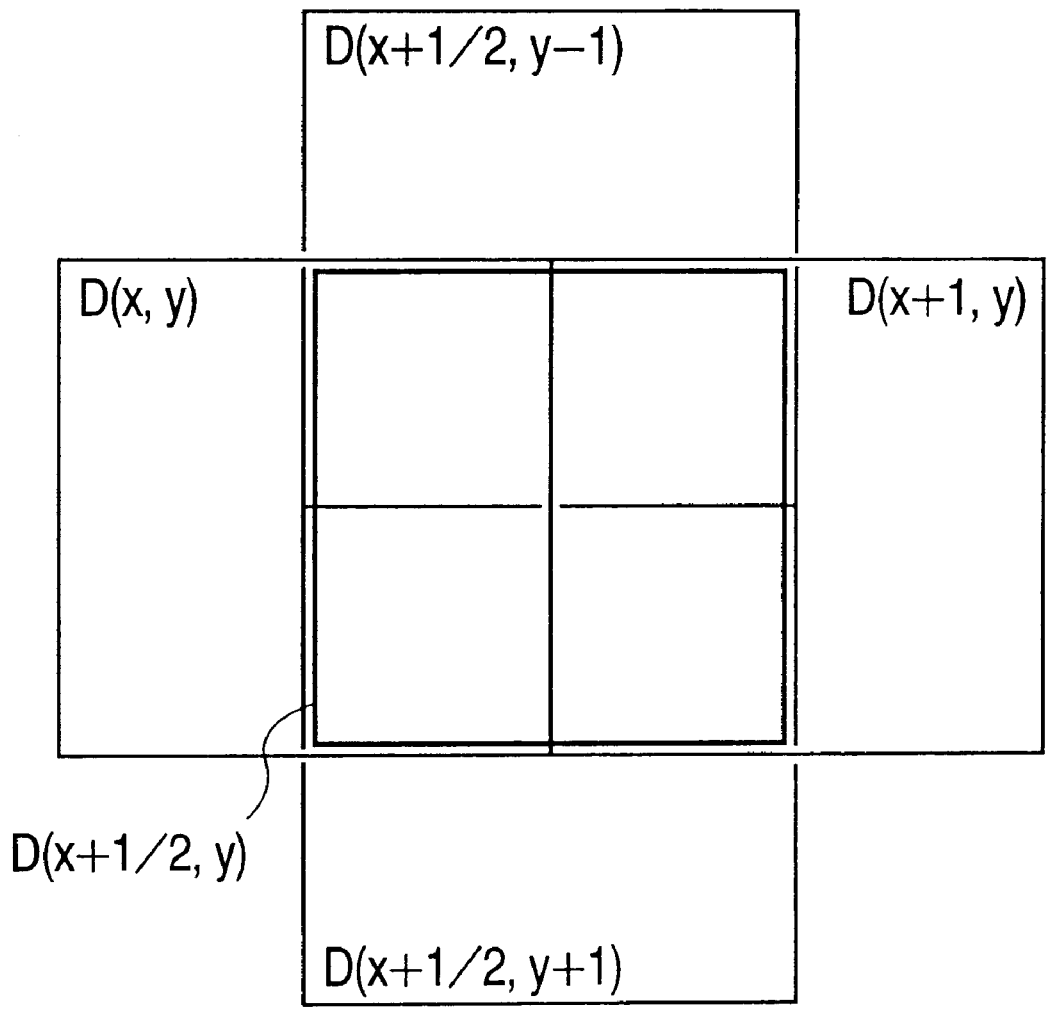
FIG. 14 is an illustration showing the arrangement of four pixel data values used for the interpolation of the pixel data for N=2 in the image reading apparatus of the third embodiment of the present invention.

Then, a method for interpolating the line sequential signals thus obtained is described below. To simplify the description, a case of N=2 is described by referring to FIG. 14. FIG. 14 shows the arrangement of four pixel data values of three different main scanning lines, in which the average value of four pixel data values of pixel data values D(x,y) and D(x+1,y) and the pixel data value D(x+1/2,y+1) on the (y+1)th line and the pixel data value D(x+1/2,y−1) on the (y−1)th line is used in order to interpolate the pixel data D(x+1/2,y) between D(x,y) and D(x+1,y) when expressing optional pixel data on an optional main scanning line as the xth D(x,y) on the yth line.

Figure 15:
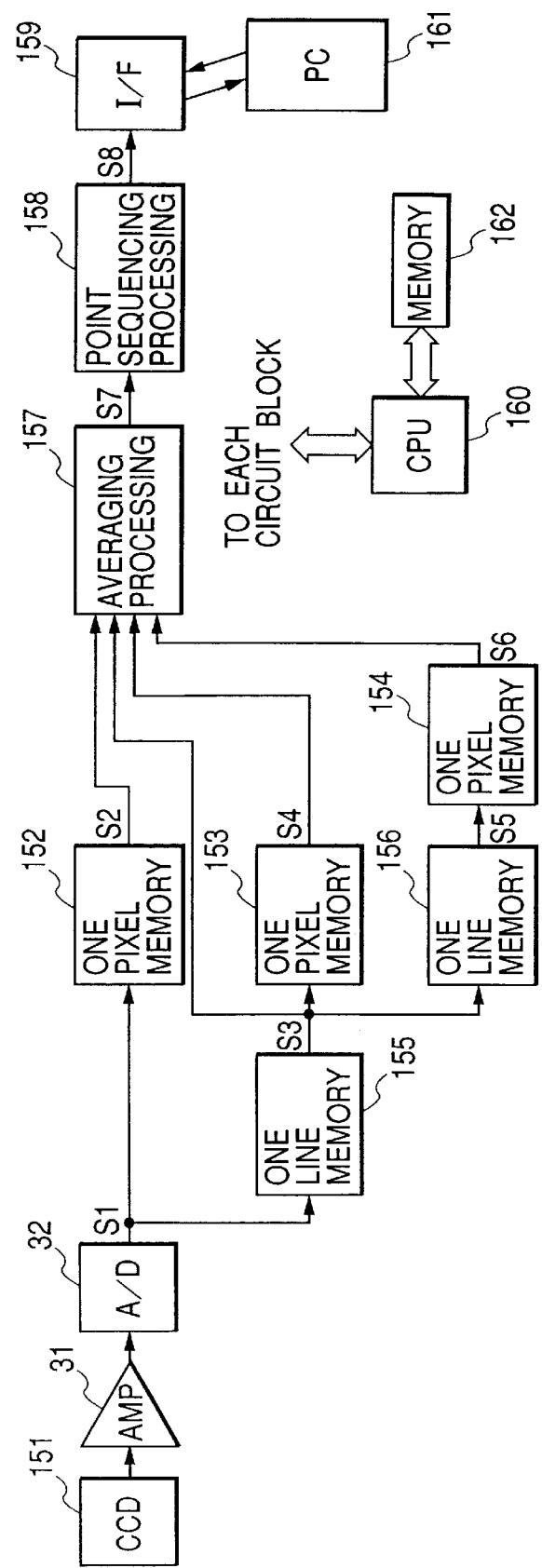
FIG. 15 is a circuit block diagram of the image reading apparatus of the third embodiment of the present invention.

FIG. 15 is a circuit block diagram for realizing the above interpolation. In FIG. 15, reference 151 denotes a CCD like the CCD shown in FIG. 13, 152, 153, and 154 denote memories for one pixel, 155 and 156 denote memories for one line, 157 denotes a circuit for averaging four pixel data values, 158 denotes a circuit for point-sequencing two pixel data values, and 159 denotes an IF circuit for performing data communication with a PC 161. The sequence for processing these circuit blocks is controlled by a CPU 160. Moreover, reference 162 denotes a memory (storage medium) storing a processing program by a CPU. It is also possible to set the processing program to the PC-161 side as software.

Figure 16:
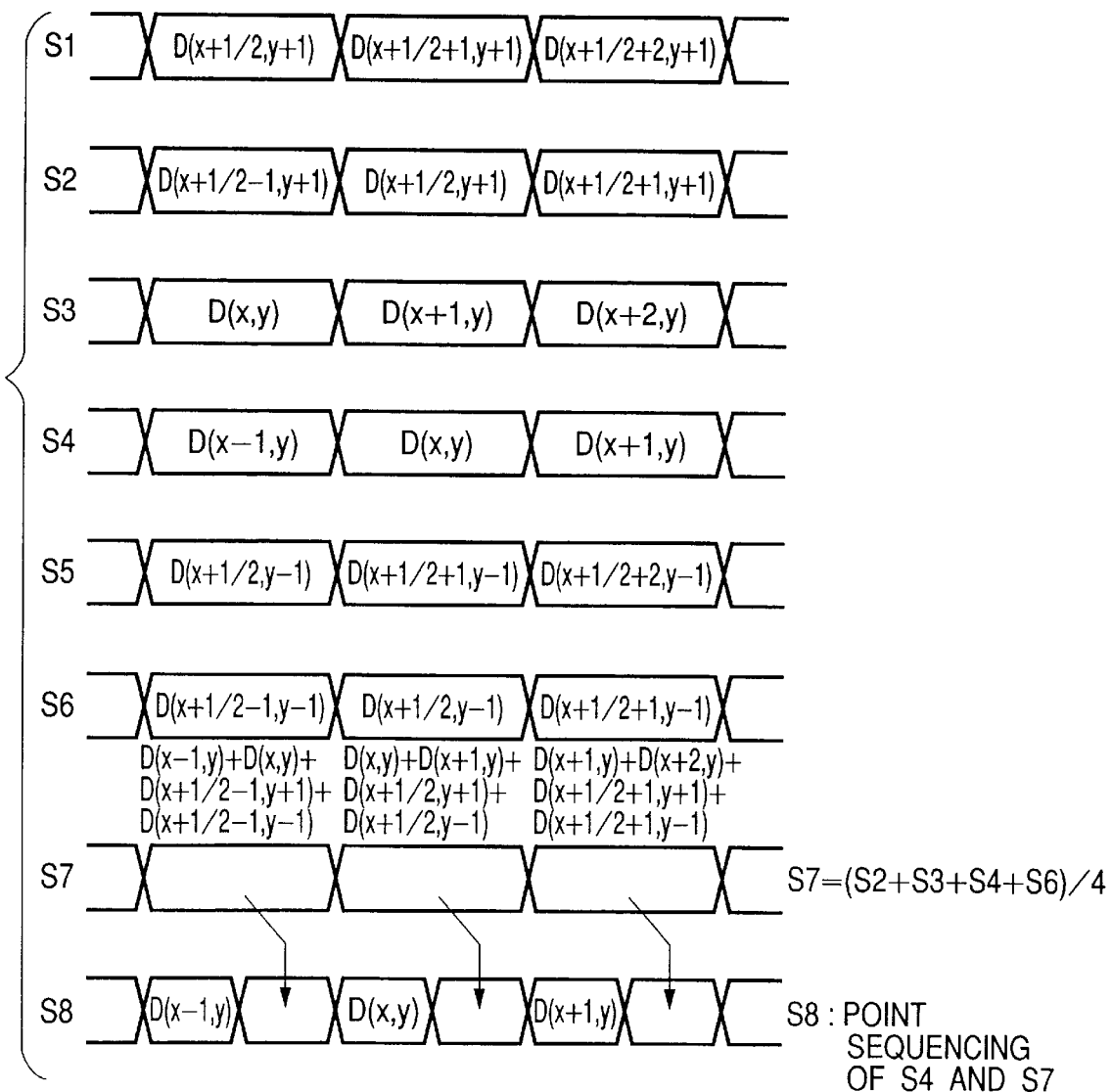
FIG. 16 is a signal waveform diagram for explaining the circuit block diagram in FIG. 15.

FIG. 16 is a signal waveform diagram showing only one-gradation data of the pixel data string of each circuit block section. Operations of a circuit block having the above structure are described below in detail. Reference S1 denotes a pixel data string output from an AD converter 31, S2 denotes an output obtained by passing S1 through a one-pixel memory 152, and S3 denotes an output obtained by passing S1 through the one-line memory 155. Moreover, reference S4 denotes an output obtained by passing S3 through the one-pixel memory 153, S5 denotes an output obtained by passing S3 through the one-line memory 156, and S6 denotes an output obtained by passing through the one-pixel memory 154. To obtain an average value 33 corresponding to FIG. 14, an average value S7 is computed in accordance with four pixel data strings of S2, S3, S4, and S6 by the averaging circuit 157. Then, the pixel data values of S4 and S7 are alternately arranged by the point sequencing circuit 158 at a ½ data cycle to generate S8. By repeating the above operation, a pixel data string having two-fold data content is obtained in main scanning direction and sub-scanning direction.

Then, a sensitivity distribution obtained by averaging four pixel data values in the case of this embodiment is described below.

Figure 17:
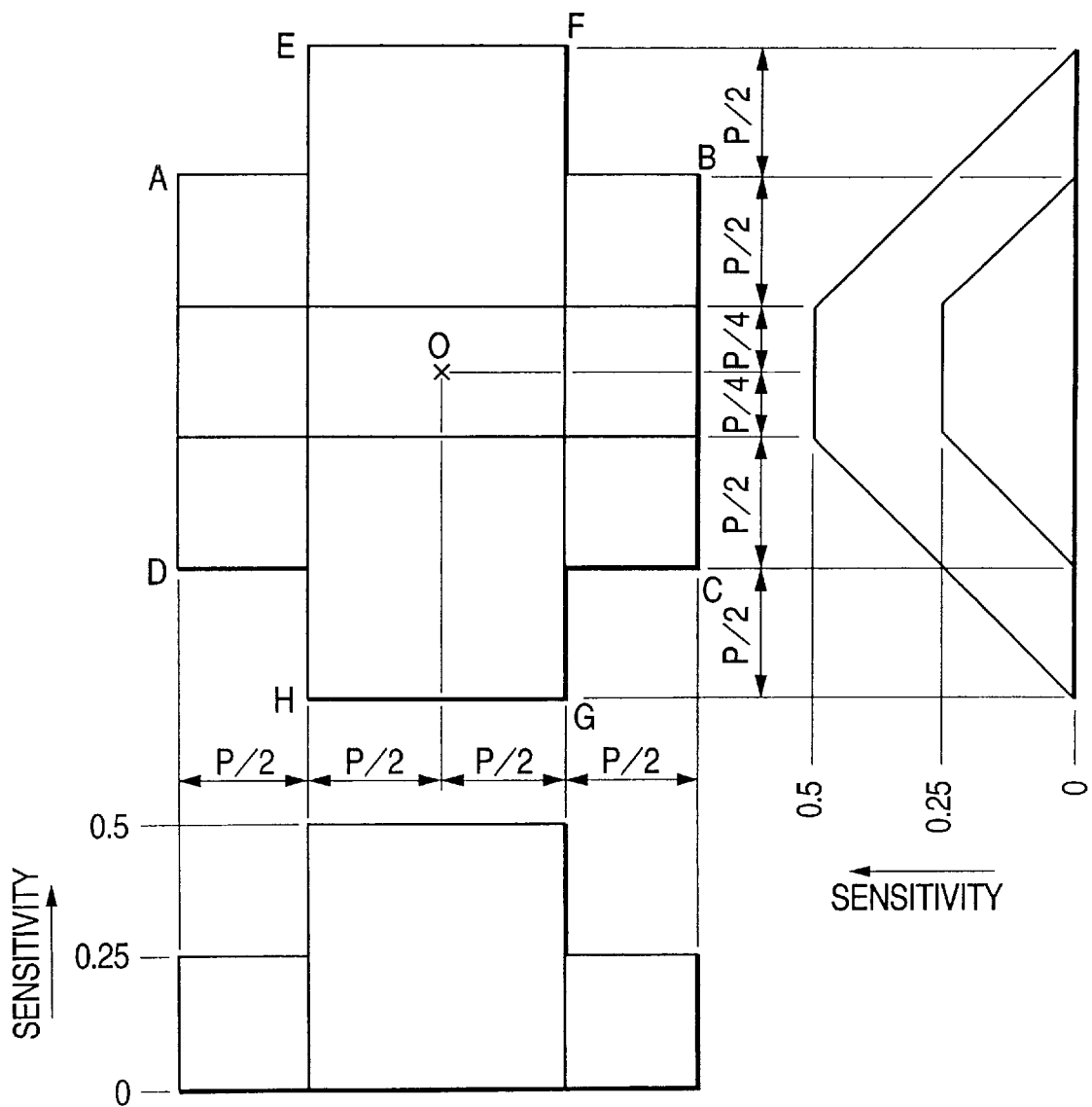
FIG. 17 is a sensitivity distribution map of pixels formed through the interpolation of the image reading apparatus of the third embodiment of the present invention.

FIG. 17 shows a three-dimensional sensitivity distribution obtained by noticing the pixel obtained by averaging four pixel data values shown in FIG. 14. That is, in FIG. 17, a quadrangle ABCD denotes a sensitivity distribution of two pixels arranged in a main scanning direction and a quadrangle EFGH denotes the sensitivity distribution of two pixels arranged in a sub-scanning direction. As shown in FIG. 14, the position of the center of gravity of sensitivity is brought to the center O of the square ABCD and quadrangle EFGH and a sensitivity distribution line-symmetric to a straight line passing through the center O is formed in main scanning direction and sub-scanning direction. In the case of the sensitivity distribution in a main scanning direction, the maximum sensitivity of "0.5" appears from the center O up to a distance P/4 on the line of the center O and a sensitivity of "0.25" appears from P/2 up to P. In the case of the sensitivity distribution in a sub-scanning direction, the maximum sensitivity of "0.5" appears from the center O up to a distance P/4 and a sensitivity of "0" appears at a distance 5P/4 because the sensitivity slowly attenuate as a position goes away from the center. Therefore, sensitivities are distributed in a range wider than the sensitivity distribution formed with only one pixel data value as shown by the case of N=2 in FIG. 4 and the MTF slightly lowers. However, because the aliasing distortion is greatly decreased, it is possible to resultantly obtain a characteristic enough as interpolation data.

Figure 18:
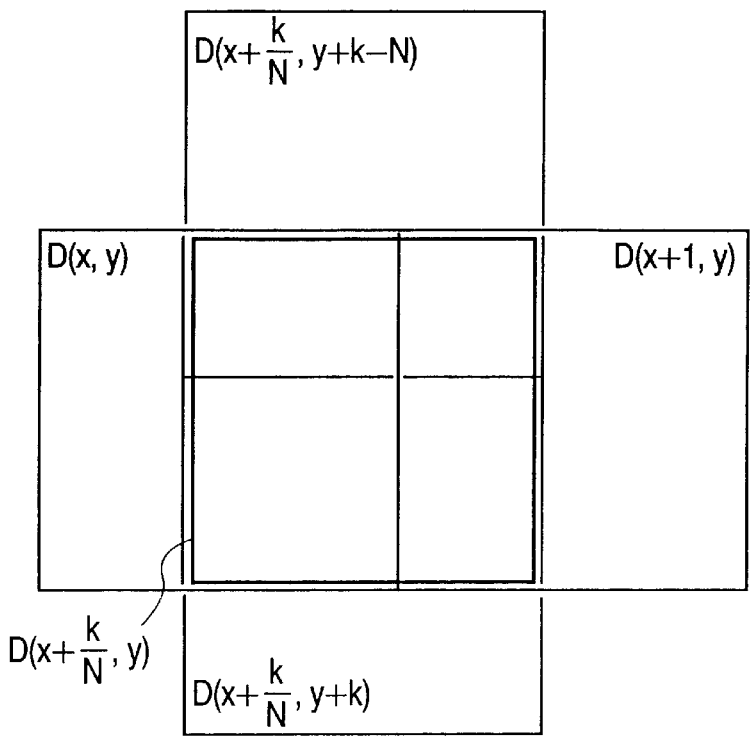
FIG. 18 is an illustration showing the arrangement of four pixel data values used for the interpolation of pixel data in the case of N times in the image reading apparatus of the third embodiment of the present invention.

A method for performing interpolation for N=2 is described above. Also ;in the case of N times, it is possible to obtain interpolation data by averaging four pixels. That is as shown in FIG. 18, when assuming optional pixel data of an optional main scanning line as D(x,y), it is possible to generate pixel data D(x+k/N,y) which is present between D(x,y) and D(x+1,y) and at a position shifted by k/N of the pitch between pixels (k is an integer and k<(N−1) from D(x,y) in order to interpolate the pixel data D(x+k/N,y) by adding the following values:

(a) Value obtained by multiplying D(x,y) by (N−k)/2N
(b) Value obtained by multiplying D(x+1,y) by k/2N
(c) Value obtained by multiplying the pixel data D(x+k/N,y) on a scanning line at a position shifted from this scanning line by k/N of the pitch between pixels in main scanning direction and sub-scanning direction, that is, the pixel data D(x+k/N,y+k) on the y+k line by k/2N
(d) Value obtained by multiplying the pixel data D(x+k/N,y+k−N) on a main scanning line N lines before the scanning line in the above Item (c), that is, the pixel data D(x+k/N,y+k−N) on the y+k−N line by (N−k)/2N.

That is, a magnification to be multiplied to each value is set so as to be inversely proportional to the distance from D(x+k/N,y).

As described above, in the case of this embodiment, it is possible to obtain an image quality almost equal to the case of the first embodiment through only one time of scanning in a sub-scanning direction and therefore, it is possible to greatly reduce the entire scanning time compared to the case of the first embodiment.

In the case of the above first, second, and third embodiments, the glass plate 11 is inserted between the focusing lens 105 and the CCD 106 in FIGS. 1A to 1C as main-scanning-directional pixel-shifting means. However, it is also possible to insert the plate 11 into any position between an original and a CCD. It is only necessary to determine the thickness and refraction factor of a glass plate so that a necessary shift value can be realized on photoelectric-conversion pixels of a CCD. Moreover, it is possible to easily realize a method of moving the CCD 106 in a main scanning direction by a necessary distance or a method of moving the original table 100 or the original D in FIG. 32B in a main scanning direction by a necessary distance as main-scanning-directional pixel-shifting means.

Furthermore, though the above embodiments are respectively described as an image reading apparatus using a CCD linear image sensor, it is also possible to apply the present invention to an image reading apparatus using a contact linear image sensor. In this case, it is possible to use a method of moving a contact linear image sensor, original table, or original in a main scanning direction by a necessary distance as main-scanning-directional pixel-shifting means.

Furthermore, though the above embodiments are respectively described as a so-called flat-bed-type image reading apparatus having an original table, it is also possible to apply the present invention to a so-called sheet-feed-type image reading apparatus for scanning an original by moving it in a sub-scanning direction. In this case, it is possible to use a method of moving a contact linear image sensor or original in a main scanning direction by a necessary distance as main-scanning-directional pixel-shifting means.

As described above, it is possible to greatly increase the number of sampled spaces in accordance with an image read by shifting a space sampling position by a predetermined distance in main scanning direction and sub-scanning direction without increasing the number of pixels of an image sensor in order to improve the resolution. Therefore, it is possible to obtain a high-quality image in which aliasing distortion hardly occurs.

Then, the fourth embodiment of the present invention is described below. In the case of the above embodiments, the MTF characteristic is slightly deteriorated because, when constituted so that the pixel data for each image signal is shifted by substantial ½ a pixel pitch through, for example, two repetitions of sub-scanning and when an optional pixel at each sub-scanning is expressed as the pixel on the yth line from the end in a sub-scanning direction in a predetermined image reading range and the xth pixel from the end in a main scanning direction in a predetermined image reading range and the position for reading the xth pixel on the yth line at the second-time sub-scanning is present at a position substantial ½ a pixel pitch from the position for reading the xth pixel on the yth line at the first-time sub-scanning in main scanning direction and sub-scanning direction, the pixel data between the xth position and the (x+1)th position on the yth line at the first-time sub-scanning is generated by adding four pixel data values of the xth pixel data and (x+1)th pixel data on the yth line and the xth pixel data on the yth line and xth pixel data on the (y−1)th line at the second-time sub-scanning and the pixel data between the xth positions on the yth line and (y+1)th line is generated by adding the xth pixel data on the yth line and xth pixel data on the (y+1)th line and the xth pixel data and (x−1)th pixel data on the yth line.

Therefore, when reading a block line in each of main scanning direction and sub-scanning direction, the black-and-white edge of the image data generated by adding four pixel data values slightly fades and this phenomenon is repeated every other pixel. Therefore, irregularity may occur in an image.

Therefore, it is an object of the following embodiment to solve the problems and provide a clear image reading apparatus and image reading method capable of realizing a low cost and a high image quality and preventing the MTF from greatly deteriorating.

Figure 32A:
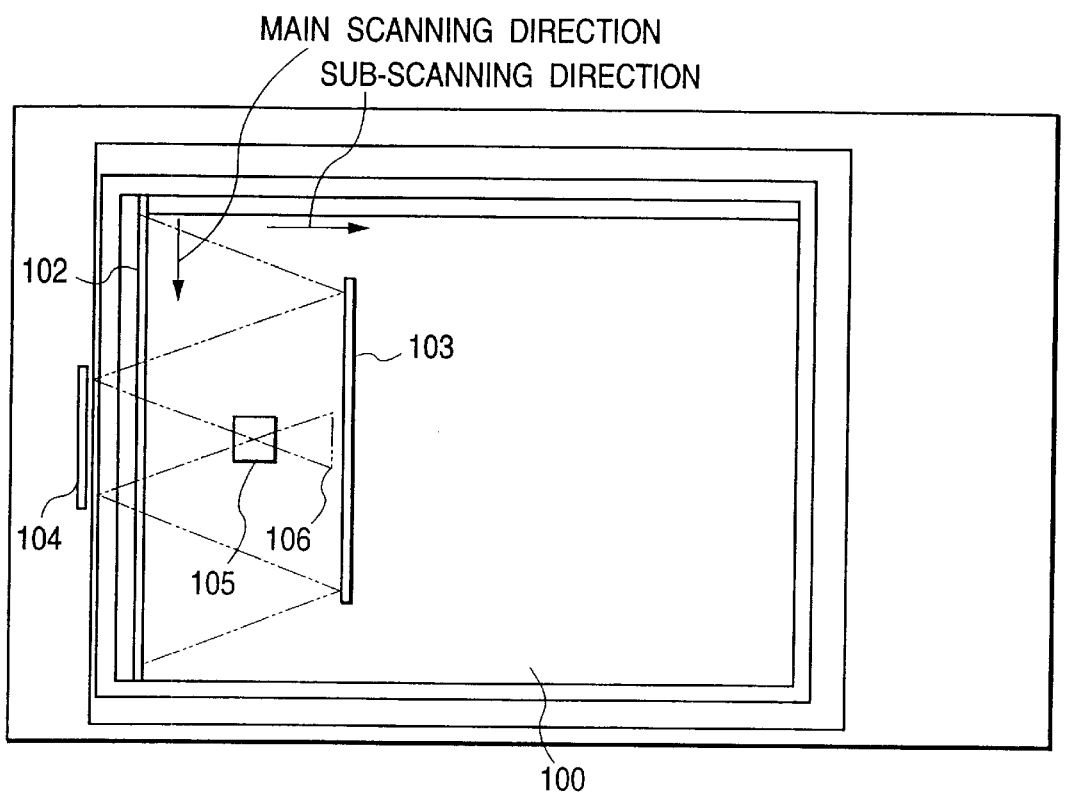
FIGS. 32A and 32B are block diagrams of a conventional image reading apparatus.

The structure of this embodiment is the same as that shown in FIGS. 1A to 1C. In the case of this structure, it is assumed that two repetitions of scanning are performed from left to right in FIGS. 32A and 32B. First, at the first-time scanning, a glass plate 11 is supported vertically to the optical axis as shown in FIG. 1B. Then, at the second-time scanning, the glass plate 11 is slightly tilted as shown in FIG. 1C so as to be shifted by ½ the pixel pitch P of an optical-axis CCD 156. Therefore, it is possible to determine the tilt of the glass plate 11 so that the shift value of the optical axis becomes P/2 in accordance with the thickness and refraction factor of the glass plate 11.

In the case of this embodiment, the scanning speed is controlled so as to make the sub-scanning-directional moving distance every repetition cycle of a ling sequential signal at each scanning almost equal to the pitch between pixels of the CCD 156. Moreover, the position of the optical image of each line sequential signal focused on a CCD through two repetitions of scanning is shifted by a value equivalent to substantial ½ the pitch P between pixels of a CCD and the timing for reading each line sequential signal is shifted by substantial ½ the repetition cycle of the line sequential signal as shown in FIG. 33B.

FIG. 19 relatively shows the pixel position and the movement of an optical image to be focused by noticing one photoelectric-conversion pixel, in which it is assumed that the position of an optical image at each scanning does not move in a main scanning direction but the pixel position moves. In FIG. 19, reference 191 shown by a continuous line denotes the xth pixel position in a main scanning direction of a predetermined-numberth main scanning line (this is assumed as the yth line) from the end in a sub-scanning direction in a predetermined image reading range at the first-time scanning and 192 shown by a dashed line denotes the xth pixel position in the main scanning direction of a line.which is the yth line from the end in a sub-scanning direction in a predetermined image reading range at the second-time scanning. The central position of each pixel is shifted by P/2 in main scanning direction and sub-scanning direction.

The central position of a pixel moves from the position A to the position B on the yth line and moves from the position B to the position C on the (y+1)th line at the first-time scanning under the repetition cycle of a line sequential signal. Moreover, the central position moves from the position D to the position E on the yth line and from the potion E to the position F on the (y+1)th line at the second-time scanning. Each moving distance is equal to P.

Therefore, in the case of the above structure, the pixel data at the first-time scanning and the pixel data at the second-time scanning are obtained by spatially sampling the positions by P/2 different from each other in main scanning direction and sub-scanning direction.

Figure 20:
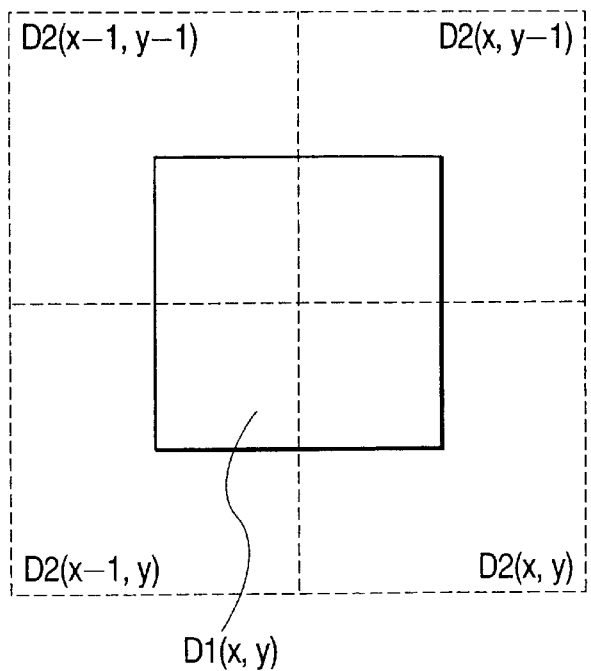
FIG. 20 is an illustration showing the arrangement of pixel data for the image reading apparatus of the fourth embodiment of the present invention.

FIG. 20 shows a method for generating new pixel data in which the pitch between adjacent pixels becomes ½ times in main scanning direction and sub-scanning direction by using the pixel data through two repetitions of scanning thus obtained. In FIG. 20, a continuous line shows the position of the pixel data at the first scanning and a dashed line shows the position of the pixel data at the second scanning, in which the xth pixel data on the yth line at the first scanning is expressed as D1(x,y) and the xth pixel data on the yth line at the second scanning is expressed as D2(x,y).

Moreover, the data obtained by averaging D2(x,y) and D2(x,y) is used as the new 2xth pixel data on the 2yth line, the data obtained by averaging D1(x,y) and D2(x−1,y) is used as the (2x−1)th pixel data on the 2yth line, the data obtained by averaging D1(x,y) and D2(x,y−1) is used as the new 2xth pixel data on the (2y−1)th line, and the data obtained by averaging D1(x,y) and D2(x−1,y−1) is used as the new (2x−1)th pixel data on the (2y−1)th line.

As described above, by performing the generation of pixel data obtained through four repetitions of averaging on D1(x,y) for every pixel data at the first scanning, it is possible to obtain the data content our times larger than the pixel data content obtained through one time of sub-scanning.

Figure 21:
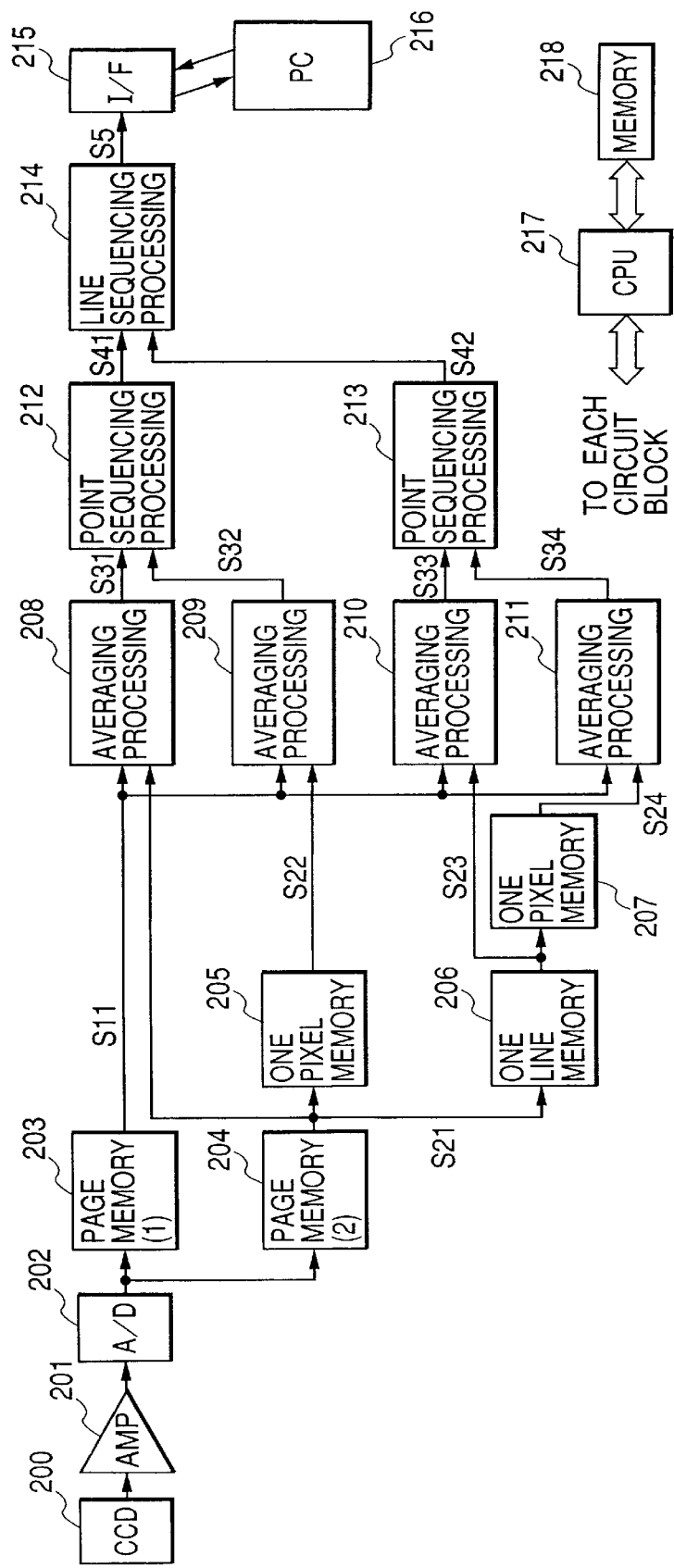
FIG. 21 is a circuit block diagram of the image reading apparatus of the fourth embodiment of the present invention.

FIG. 21 is a circuit block diagram for performing the above averaging. In FIG. 21, reference 200 denotes an image-pickup device such as a CCD serving as image-pickup means, 201 denotes a signal amplifier, 202 denotes an A-D converter, 203 and 204 denote page memories capable of storing image data obtained through two repetitions of scanning.

References 205 and 207 denote memories capable of storing the data for one pixel, 206 denotes a memory capable of storing the data for one line, 208, 209, 210, and 211 denote circuits for respectively averaging two pixel data values, 212 and 213 denote circuits for respectively point-sequencing two pixel data values, and 214 denotes a circuit for line-sequencing two pixel data strings.

Reference 215 denotes an interface (IF) circuit for performing data communication with a PC 216 and the sequence for processing these circuit blocks is controlled by a CPU 217.

Figure 22:
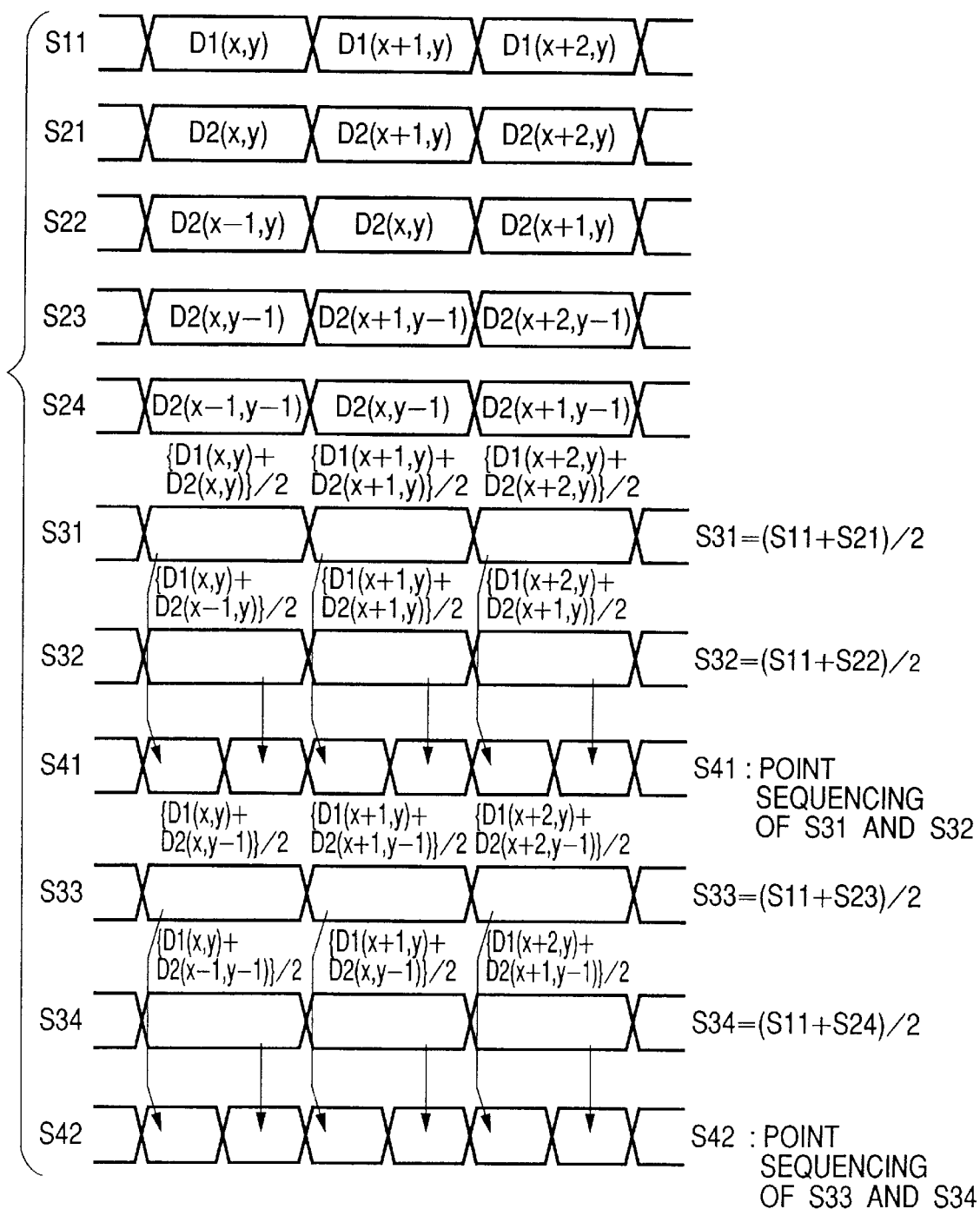
FIG. 22 is a signal waveform diagram for explaining the circuit block diagram in FIG. 21.

FIG. 22 is a signal waveform diagram showing only one-gradation data of the pixel data string of each circuit block section. Operations of a circuit block having the above structure are described below in detail by referring to FIG. 22. References S11 and S21 denote pixel data strings output from the page memories 203 and 204, S22 denotes an output obtained by delaying S21 by one pixel through the one-pixel memory 205, and S23 denotes an output obtained by delaying S21 by one line through the one-line memory 206.

Moreover, reference S24 denotes an output obtained by delaying S23 by one more pixel through the one-pixel memory 207.

To obtain an average value corresponding to FIG. 21, an average value S31 is first computed by the averaging circuit 208 in accordance with two pixel data strings of S11 and S21 and moreover, an average value S32 is computed by the averaging circuit 209 in accordance with two pixel data strings of S11 and S22.

Then, an average value S33 is computed by the averaging circuit 210 in accordance with two pixel data strings of S11 and S23 and an average value S34 is computed by the averaging circuit 211 in accordance with two pixel data strings of S11 and S24.

Then, the pixel data strings of S31 and S32 are alternately arranged by the point-sequencing circuit 212 at a ½ data cycle to generate S41. Moreover, the pixel data strings of S33 and S34 are alternately arranged by the point-sequencing circuit 202 at a ½ data cycle to generate a pixel data string S42.

Then, the pixel data strings of S41 and S42 are alternately output by the line-sequencing circuit 204 every line and thus, a pixel data string S5 having two-fold data content in main scanning direction and sub-scanning direction is obtained.

In the case of this embodiment, an image data memory is mounted on an image reading apparatus. However, it is also possible to mount the memory on the PC 216 side. It is more realistic to use a memory built in the PC 216 side in order to decrease the cost of the image reading apparatus. In this case, read and write of data from and in the above memory and point sequencing are controlled so as to be performed at the PC 216 side by an application software.

The sensitivity distribution when averaging two pixel data values for this embodiment is described below.

First, it is assumed that each photoelectric-conversion pixel of a CCD is a square pixel having an opening ratio of 100%. Moreover, it is assumed that a photoelectric-convetsion pixel moves by substantial P in the direction opposite to a sub-scanning direction instead of the fact that an optical image moves in a sub-scanning direction by a pixel pitch P every repetition cycle of a main scanning line. Therefore, the sensitivity distribution of one pixel data value D1(x,y) is three-dimensionally shown in FIG. 23 as a trihedron having a quadrangle ABCD as the bottom face and EF as the top side. The trihedron has a volume of $p^2$ and its top side EF has a maximum sensitivity of "1".

Figure 23:
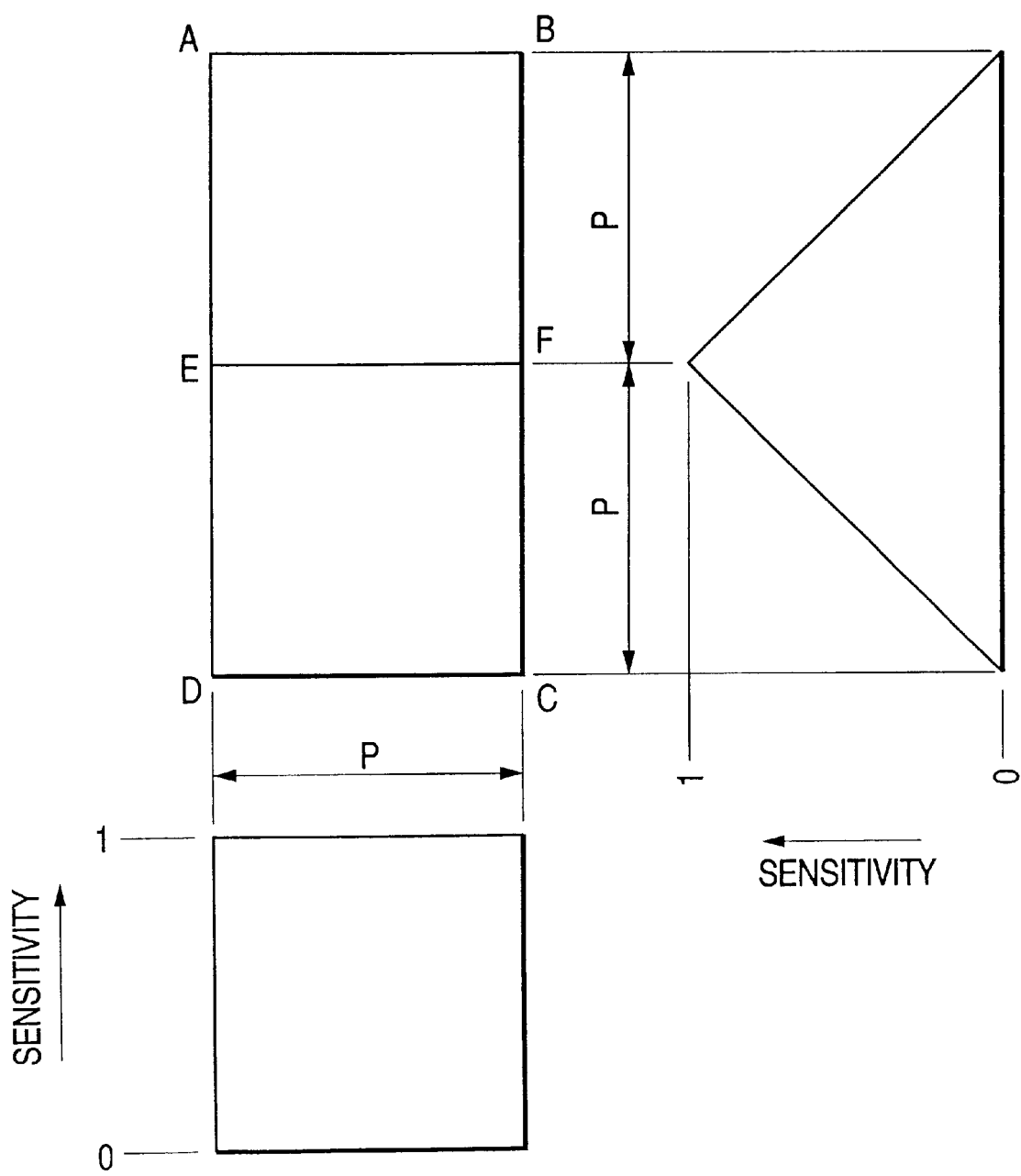
FIG. 23 is a sensitivity distribution map of one-pixel data in FIG. 20.
Figure 24:
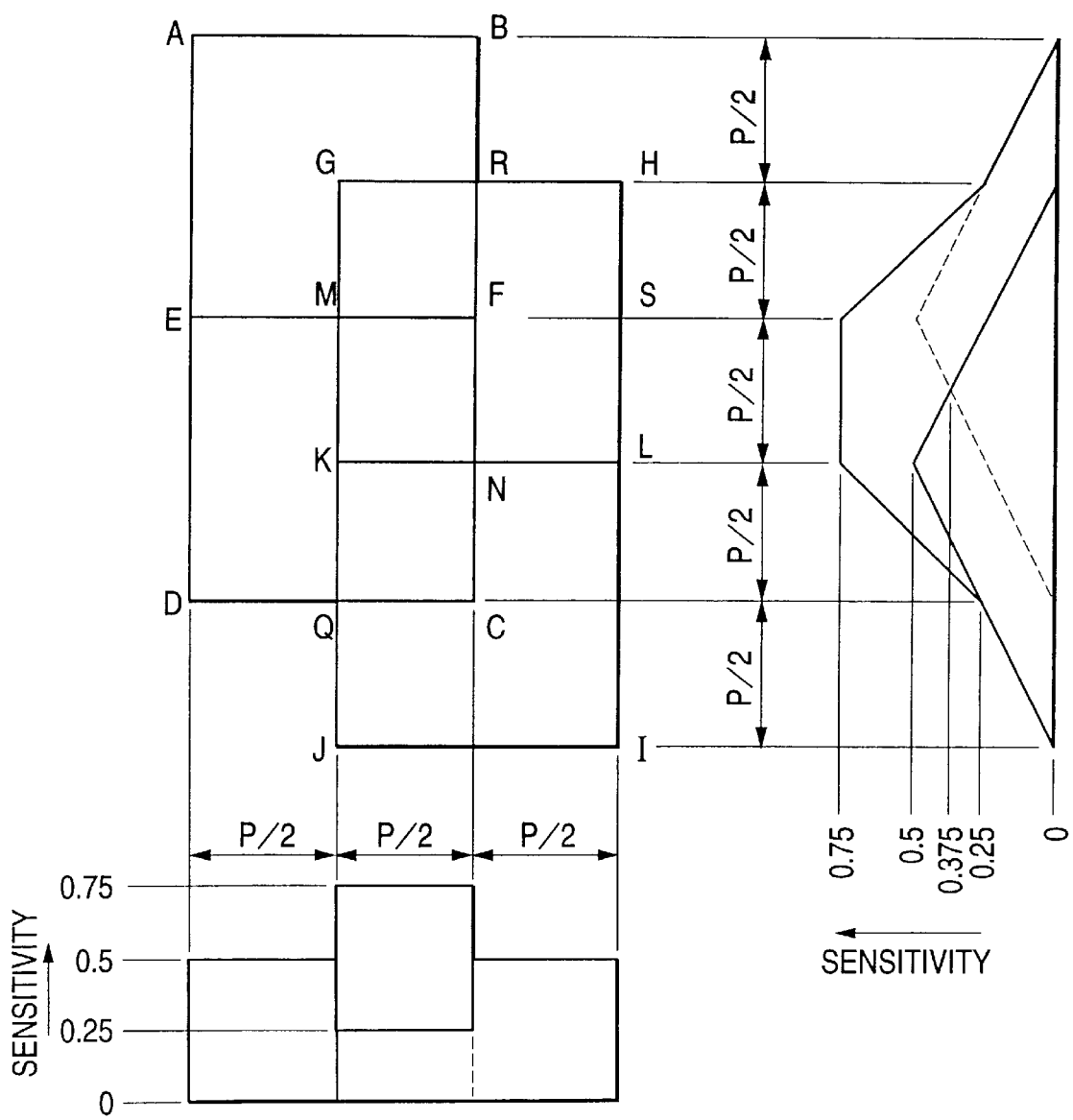
FIG. 24 is a sensitivity distribution map after the averaging operation of two-pixel data in FIG. 20.

FIG. 24 three-dimensionally shows the sensitivity distributions of two pixel data values D1(x,y) and D2(x,y) diagonally faced each other shown in FIG. 20 by superimposing them each other. Similarly to FIG. 23, the sensitivity distribution of pixel data value D1(x,y) is shown as a trihedron having a quadrangle ABCD as the bottom face and EF as the top side and the sensitivity distribution of pixel data value D2(x,y) is shown as a trihedron having a quadrangle GHIJ as the bottom face and KL as the top side, and they are superimposed each other. That is, a quadrangle MFNK is assumed as the maximum sensitivity "0.75" in a sensitivity distribution, the center is assumed as the center of gravity of sensitivity, a distribution whose sensitivity is slowly lowered in a sub-scanning direction from the center of gravity of sensitivity is shown, and a sensitivity distribution having a sensitivity of 0.375 in a main scanning direction is shown.

By comparing FIG. 23 with FIG. 24, it is found that the sensitivity distribution obtained by averaging two pixel data values slightly spreads in main scanning direction and sub-scanning direction but the MTF is not greatly deteriorated because the sensitivity of the quadrangle MFNK including the center of gravity of sensitivity accounts for a large rate in the entire sensitivity distribution.

Similarly to the above case, as the result of examining the sensitivity distributions of new pixel data values obtained by averaging every two pixel data values D1(x,y) and D2(x−1,y), D1(x,y) and D2(x,y−1), and D1(x,y) and D2(x−1,y−1) shown in FIG. 20, it is found that sensitivity distributions are obtained which use the centers of quadrangles KNCQ, RHSF, and GRFM (FIG. 24) as their center-of-gravity positions. Therefore, it is possible to read a density change pattern on an original, in which the distance P/2 in a main scanning direction and sub-scanning direction of these four quadrangles is set to ½ the repetition cycle.

Figure 25:
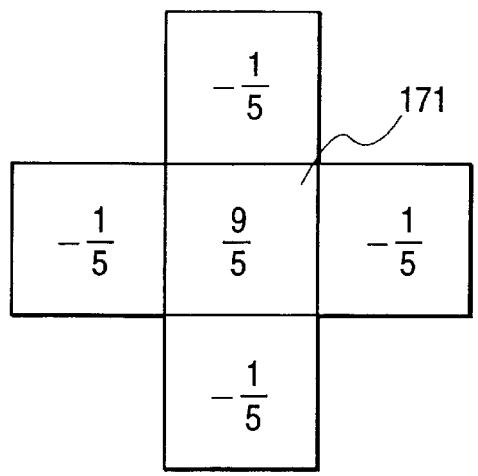
FIG. 25 is an illustration showing an example of a matrix coefficient of a digital filter for correcting the MTF of the fourth embodiment.

As previously described, in the case of this embodiment, the MTF is not greatly deteriorated compared to the case of FIG. 23. However, it is also possible to correct a slight deterioration of the MTF by a simple digital filter for main scanning and sub-scanning. For example, as shown in FIG. 25, by forming a matrix filter using 9/5 as a coefficient to be multiplied to a purposed pixel 171 obtained by averaging two pixel data values and −⅕ as a coefficient to be multiplied to every two pixels in a main scanning direction and sub-scanning direction respectively centering around the purposed pixel 171, it is possible to set the sensitivity of the quadrangle MFNK including the position of the center of gravity of sensitivity shown in FIG. 24 to "1" and completely improve the MTF.

As described above, this embodiment makes it possible to obtain a very minute image having two-fold sampled spaces in main scanning direction and sub-scanning direction compared to the image data obtained through one time of sub-scanning.

In the case of this embodiment, directions of two repetitions of sub-scanning are the same. However, it is also possible to use a structure in which sub-scanning directions are opposite to each other at the first-time scanning and the second-time scanning. That is, it is possible to use a structure in which the first-time scanning is started with one end of an original and completed at the other end of the original and continuously, the second-time scanning is started with the other end of the original. In this case, it is necessary to read the image data at the second-time scanning in FIG. 21 from the page memory 204 in FIG. 21 in the reverse sequence in a sub-scanning direction.

The second-time image data at the same position as the image data D(x,y) at the first-time scanning is shown as D(x,z-y+1) by assuming the total number of scanning lines in a predetermined image reading range as z. Thus, it is possible to obtain a very minute image through the averaging, point-sequencing, and line-sequencing same as the method previously described.

By making sub-scanning directions opposite to each other at the first-time scanning and the second-time scanning as described above, it is possible to decrease the entire reading time compared to the case of the same sub-scanning direction.

The fifth embodiment of the present invention is constituted so that the number of repetitions of sub-scanning is set to only one, the sub-scanning-directional moving distance of scanning means at every repetition cycle of a line sequential signal is set to substantial ½ the pitch P between photoelectric-conversion pixels, and a pixel is shifted on the unit basis of P/2 in a main scanning direction by pixel-shifting means every repetition cycle of a line sequential signal. The pixel-shifting means follows the same method as the case of the first embodiment and uses the glass plate 11 shown in FIG. 1.

Figure 26:
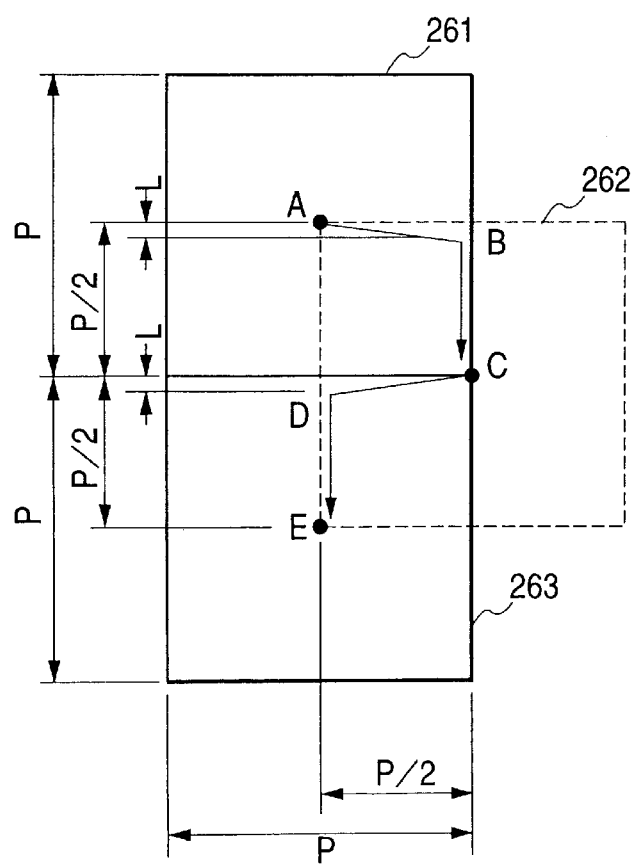
FIG. 26 is an illustration showing the arrangement of pixels and relative positions of an optical image of the image reading apparatus of the fifth embodiment of the present invention.

Operations of the above structure are described below by referring to FIG. 26. FIG. 26 relatively shows the pixel position and the movement of an optical image to be focused by noticing one photoelectric-conversion pixel, in which it is assumed that the position of the optical image on each main scanning line does not move in a main scanning direction but the pixel position moves. In FIG. 26, reference 261 shown by a continuous line denotes the xth pixel position in a main scanning direction on a main scanning line (this is assumed as the yth line) serving as a predetermined numberth line from the end in a sub-scanning direction in a predetermined image reading range, 262 shown by a dashed line denotes the xth pixel position on the (y+1)th line, and 263 shown by a continuous line denotes the xth pixel position on the (y+2)th line. The central position A of a pixel on the yth line is first moved to the position B by pixel-shifting means during the repetition cycle of a line sequential signal and then moved from the position B to the central position C of a pixel on the (y+1)th line in accordance with the scanning in a sub-scanning direction.

Then, the position A is moved by the pixel-shifting means from the position C to the position D during the repetition cycle of the next line sequential signal and then, moved from the position D to the central position E of a pixel on the (y+2)th line in accordance with the scanning in a sub-scanning direction. That is, the moving distance of the central position of a pixel is equal to P/2 in main scanning direction and sub-scanning direction.

Therefore, in the case of the above structure, the pixel data on the yth line and the pixel data on the (y+1)th line are obtained by space-sampling positions by P/2 different from each other in main scanning direction and sub-scanning direction.

Figure 27:
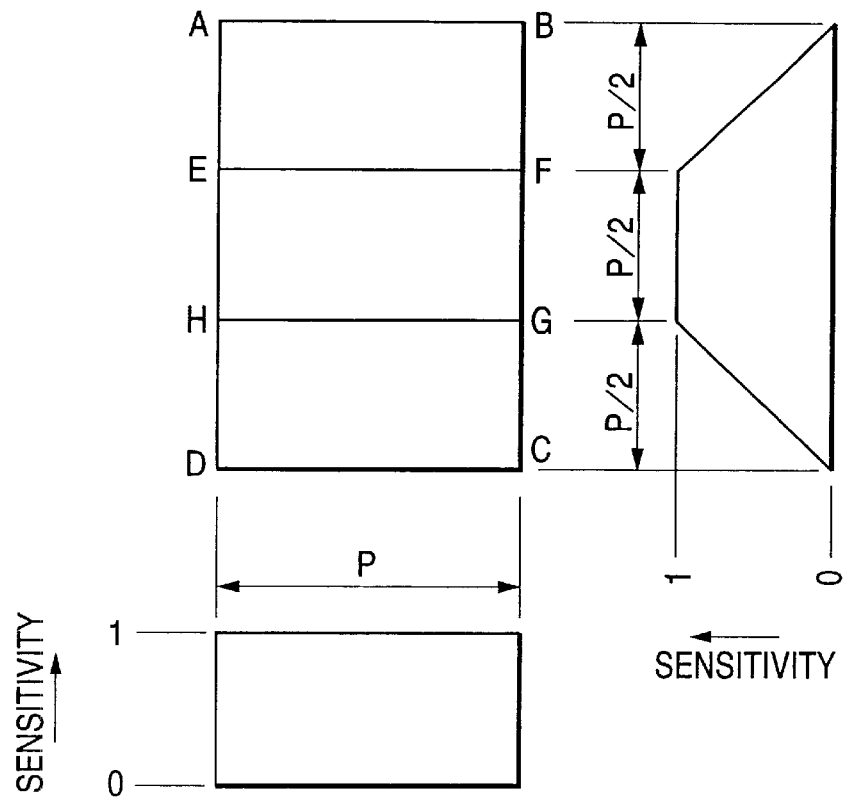
FIG. 27 is a sensitivity distribution map of one-pixel data for the image reading apparatus of the fifth embodiment of the present invention.

In this case, sub-scanning-directional distances L from the position A up to the position B and from the position C up to the position D are proportional to the moving time of an optical image by the pixel-shifting means. FIG. 27 three-dimensionally shows the sensitivity distribution of the pixel at one cycle of a line sequential signal according to the signal electric charges photoelectrically-converted and accumulated during the period while moving from the position A up to the position C when the moving time is short enough compared to the repetition cycle of a line sequential signal. That is, in FIG. 27, the sensitivity distribution becomes a tetrahedral sensitivity distribution using a quadrangle ABCD as the bottom face and a quadrangle EFGH as the top side in FIG. 27 and the quadrangle EFGH has a sensitivity of "1". Moreover, the sensitivity distribution three-dimensionally shown during the period while moving from the position C up to the position E becomes a distribution shifted from that in FIG. 27 by P/2 in main scanning direction and sub-scanning direction.

Figure 28:
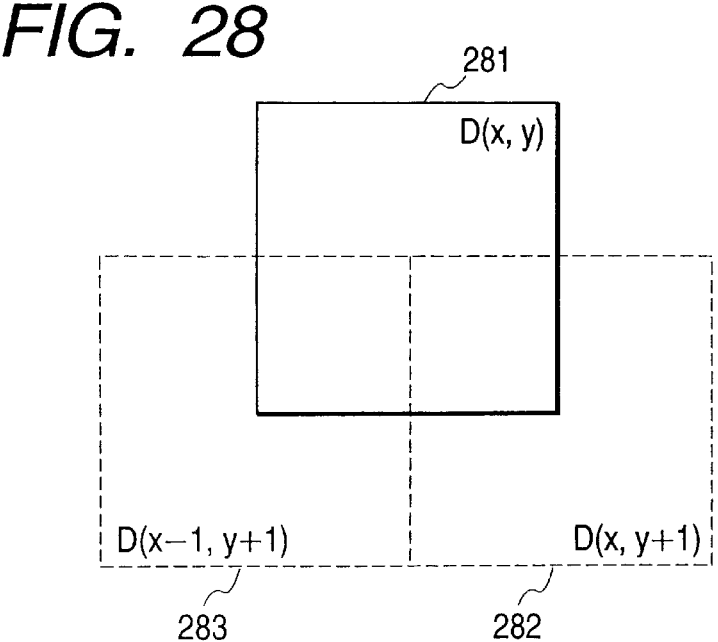
FIG. 28 is an illustration showing the arrangement of pixel data for the image reading apparatus of the fifth embodiment of the present invention.

FIG. 28 shows a method for generating new pixel data in which the pitch between adjacent pixel data values is halved in main scanning direction and sub-scanning direction by using the pixel data according to the above scanning method. In FIG. 28, reference 281 shown by a continuous line is shown as the xth pixel data D(x,y) on the yth line and 282 and 283 shown by a dashed line are shown as the xth and (x−1)th pixel data values D(x,y+1) and D(x−1,y+1) on the (y+1)th line. Moreover, the data obtained by averaging D(x,y) and D(x,y+1) is assumed as the new 2xth pixel data on the yth line and the data obtained by averaging D(x,y) and D(x−1,y+1) is assumed as the new (2x−1)th pixel data on the yth line.

Figure 29:
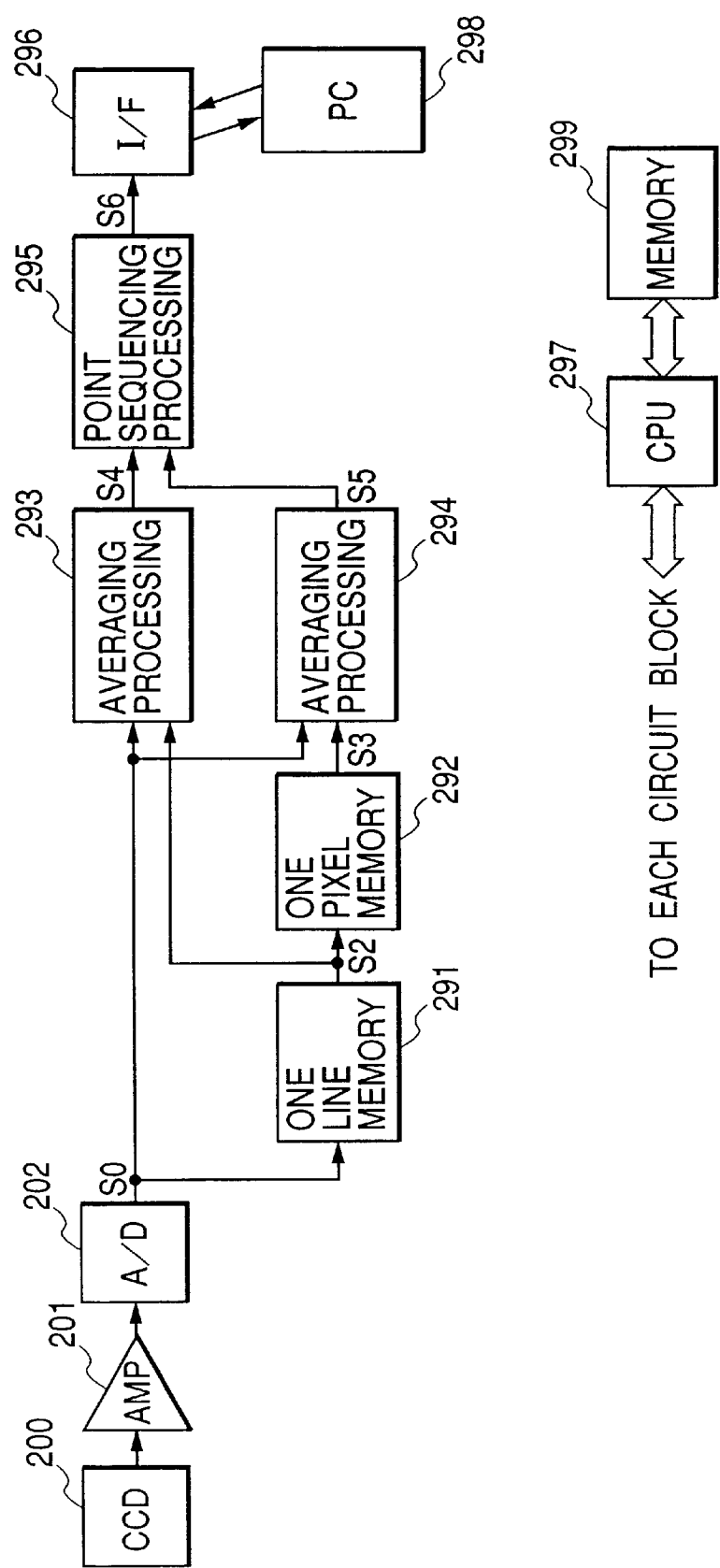
FIG. 29 is a circuit block diagram of the image reading apparatus of the fifth embodiment of the present invention.

As described above, by performing the generation of the pixel data through two repetitions of averaging related to D(x,y) for every pixel data on y lines, it is possible to double the pixel data content in a main scanning direction on y lines FIG. 29 is a circuit block diagram for performing the above averaging. In FIG. 29, a component having a function same as that in FIG. 21 is provided with the same reference and its description is omitted.

Reference 291 denotes a memory for one line, 292 denotes a memory for one pixel, 293 and 294 denote circuits for averaging two data values, 295 denotes a circuit for point-sequencing two pixel data values, and 296 denotes an IF circuit for performing data communication with a PC 298. The sequence for processing these circuit blocks is controlled by a CPU 297.

Figure 30:
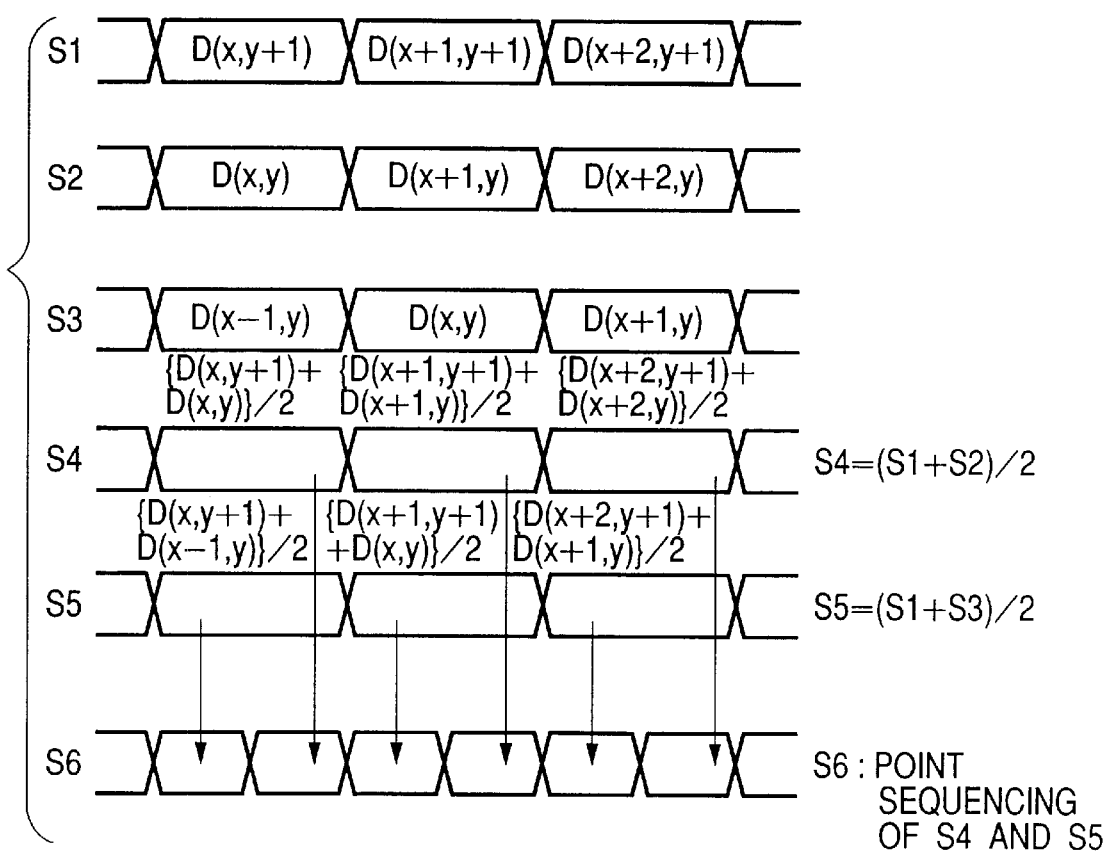
FIG. 30 is a signal waveform diagram for explaining the circuit block diagram in FIG. 29.

FIG. 30 is a signal waveform diagram showing only one-gradation data of the pixel data string of each circuit block section. Operations of a circuit block having the above structure are described below in detail by referring to FIG. 30. Reference S1 denotes a pixel data string output from an A-D converter 201, S2 denotes an output obtained by passing S1 through one-line memory 291, and S3 denotes an output obtained by passing S2 through the one-pixel memory 292.

To obtain an average value corresponding to FIG. 28, an average value S4 is computed by the averaging circuit 293 in accordance with two pixel data strings of S1 and S2 and an average value S5 is computed by the averaging circuit 294 in accordance with two pixel data strings of S1 and S3. Then, pixel data values for S4 and S5 are alternately arranged by the point-sequencing circuit 295 at a ½ data cycle to generate S6. By repeating the above operation every line, it is possible to obtain a pixel data string having two-fold data content in a main scanning direction.

As described for the fourth embodiment, a memory for image data is mounted on the image reading apparatus side. However, it is also possible to mount the memory at the PC-298 side. In this case, it is necessary to perform write and read of data in and from a memory and point sequencing so as to be controlled by an application software at the PC-298 side.

Figure 31:
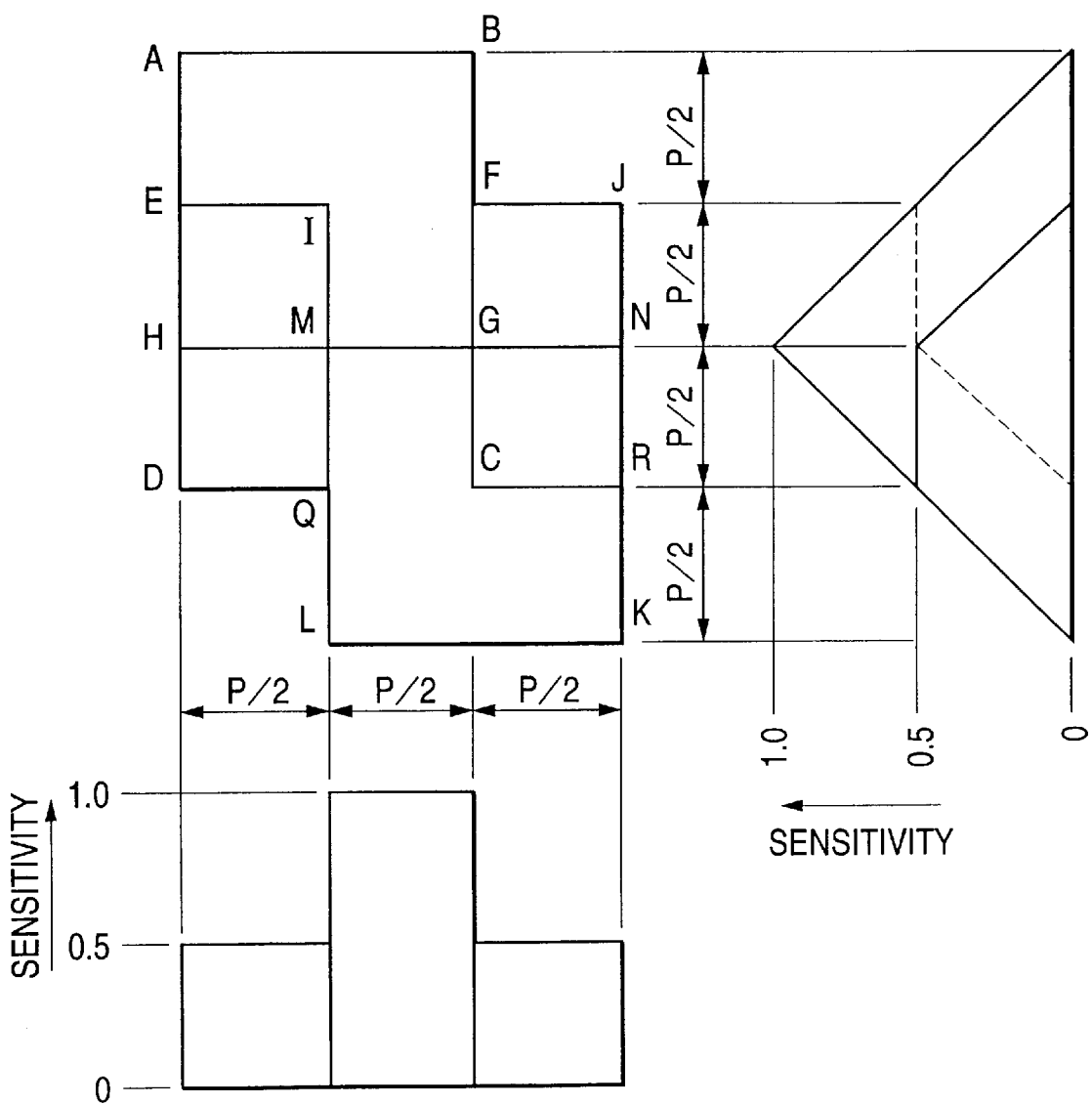
FIG. 31 is a sensitivity distribution map after the averaging operation of the two pixel data values in FIG. 28.

FIG. 31 shows a sensitivity distribution after averaging the two pixel data values thus obtained. That is, the sensitivity distribution of the pixel data D(x,y) in FIG. 28 is distributed as shown by the quadrangle ABCD described in FIG. 27 and the sensitivity distribution of pixel data D(x, y+1) is distributed as shown by the quadrangle IJKL. As shown in FIG. 31, by using the average value of two pixel data values, the position of center of gravity of sensitivity is brought to the center of the line segment MG having a length P/2. Moreover, the maximum sensitivity of "1.0" is shown on the line segment MG and a sensitivity of "0.5" is shown from P/4 up to 3P/4 at the right and left in a main scanning direction from the center of the line segment MG. The sensitivity distribution in a sub-scanning direction slowly attenuate in sensitivity as a position goes away from the line segment MG at the top and the bottom and the sensitivity distribution has a sensitivity of "0" at the distance P. Therefore, the sensitivity distribution shows a distribution narrowed to the center of gravity of sensitivity compared to the sensitivity distribution in FIG. 24 as shown in the fourth embodiment and resultantly, the MTF is slightly improved and it is possible to read a more-minute image.

However, when it is impossible to ignore the moving time of an optical image by pixel-shifting means compared to the repetition cycle of a line sequential signal, it is possible to sweep away the signal electric charges photoelectrically converted and accumulated during the period from the position A up to the position B in FIG. 26.

A CCD linear image sensor suitable for the above object can use the structure shown in FIG. 13.

As described above, this embodiment makes it possible to obtain an image quality more minute than the case of the fourth embodiment because of only one time of the scanning in a sub-scanning direction and moreover decrease the entire scanning time compared to the case of the fourth embodiment.

In the case of the fourth and fifth embodiments, the glass plate 11 is inserted between the focusing lens 105 and the CCD 106 in FIGS. 1A to 1C as main-scanning-directional pixel-shifting means. Moreover, it is possible to set the glass plate 11 to any position between an original and a CCD. It is possible to determine the gradient of a glass plate in accordance with the thickness and refraction factor of the glass plate so that a necessary shift value can be realized on the photoelectric-conversion pixel of a CCD.

Figure 32B:
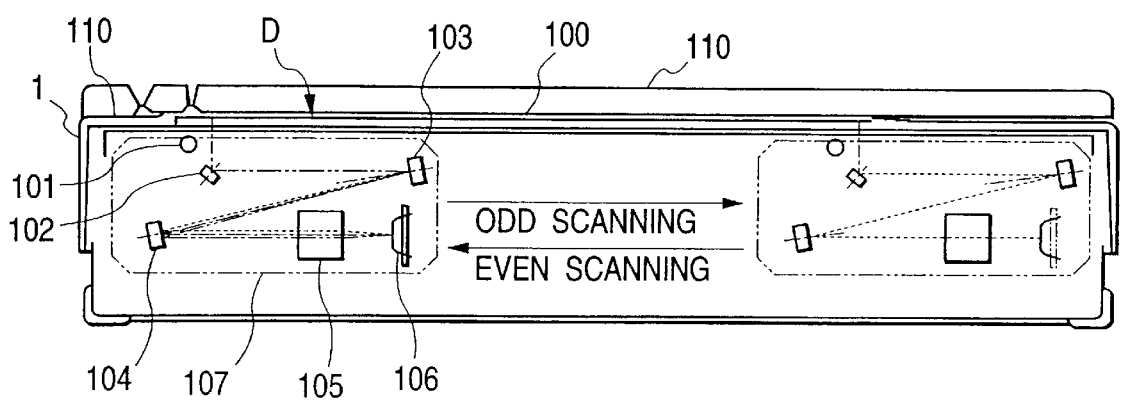

Moreover, it is possible to easily realize a method of moving the CCD 106 by a necessary distance in a main scanning direction and a method of moving the original table 100 or the original D in FIG. 32B by a necessary distance in a main scanning direction as main-scanning-directional pixel-shifting means.

Furthermore, though each of the above embodiments is described as an image reading apparatus using a CCD linear image sensor, it is also possible to apply the present invention to an image reading apparatus using a contact linear image sensor. In this case, it is possible to use a method of moving a contact linear image sensor, original table, or original by a necessary distance in a main scanning direction as main-scanning-directional pixel-shifting means.

Furthermore, though each of the above embodiments is described as a so-called flat-bed-type image reading apparatus having an original table, it is also possible to apply the present invention to a so-called sheet-feed-type image reading apparatus for scanning an original by moving the original in a sub-scanning direction. In this case, it is possible to use a method of moving a contact linear image sensor or original by a necessary distance in a main scanning direction as main-scanning-directional pixel-shifting means.

As described above, the above embodiments make it possible to double the number of sampled spaces in accordance with an image read by shifting a space sampling position by every predetermined distance in main scanning direction and sub-scanning direction without increasing the number of pixels of an image sensor in order to improve the resolution. Therefore, it is possible to obtain a very-minute image.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:

an optical unit adapted to focus an optical image of an original;

an image sensor for linearly arranging pluralities of photoelectric-conversion pixels, accumulating a linear optical image focused by said optical unit in said photoelectric-conversion pixels as signal electric charges, and successively outputting said signal electric charges as image signals every predetermined period;

a scanning unit adapted to scan said original in a sub-scanning direction vertical to a main scanning direction serving as the direction of said linear optical image; and a pixel-shifting unit adapted to shift the relative positions between the position of an optical image focused on said image sensor through said optical unit and said photoelectric-conversion pixels on the unit basis of substantially 1/N (N is an integer) of the pixel pitch of said image sensor in said main scanning direction;

wherein said image sensor is a linear image sensor, sub-scanning is performed by said scanning unit N times, and pixel shifting is performed on the unit basis of substantially 1/N of the pitch between pixels of said linear image sensor; wherein the sub-scanning-directional moving distance of said scanning unit at every repetition cycle of a line sequential signal output from said linear image sensor is made almost equal to the pitch between pixels of said linear image sensor, and the position of the optical image of each of said line sequential signals focused on said linear image sensor through said N repetitions of scanning is shifted by a value equivalent to substantial 1/N the pitch between pixels of said linear image sensor; and, wherein when expressing an optional pixel at any scanning as the xth pixel from the end in a predetermined main scanning direction in an image reading range on the yth line from the end in a predetermined sub-scanning direction in the image reading range, the pixel data at a position between the xth pixel and the (x+1)th pixel on the yth line and shifted from the xth pixel by k/N (k is an integer and k<_N−1) the pitch between pixels is generated by adding such four pixel data values as a value obtained by multiplying the xth pixel data by (N−k)/2N, a value obtained by multiplying the (x+1)th pixel data by k/2N, a value obtained by multiplying the pixel data at a position shifted from the end in said predetermined sub-scanning direction by k/N of the pitch between pixels from the (y−1)th line in a sub-scanning direction and moreover shifted from the end in said predetermined main scanning direction by k/N of the pitch between pixels in a main scanning direction from the xth pixel by k/2N at the scanning at a position shifted by k/N of the pitch between pixels from the position at the above scanning in main scanning direction and sub-scanning direction, and a value obtained by multiplying the pixel data at a position shifted by k/N of the pitch between pixels in a sub-scanning direction from the yth line and shifted by k/N of the pitch between pixels in a main scanning direction from the xth pixel by (N-k)/2N, and the data at a position between the xth pixels on the yth line and the (y+1)th line and shifted from the pixel on the yth line by m/N (m is an integer and m<_N−1) of the pitch between pixels is generated by adding such four pixel data values as a value obtained by multiplying the pixel data on the yth line by (N−m)/N, a value obtained by multiplying the pixel data on the (y+1)th line by m/N, a value obtained by multiplying the pixel data at a position shifted by m/N of the pixel pitch in a main scanning direction from the (x−1)th pixel and shifted by m/N of the pitch between pixels in a sub-scanning direction from the yth line at the scanning at a position shifted by m/N of the pixel pitch from the case of the above scanning in main scanning direction and sub-scanning direction by m/2N, and a value obtained by multiplying the pixel data at a position shifted by m/N of the pitch between pixels in a main scanning direction from the xth pixel and shifted by m/N of the pitch between pixels in a sub-scanning direction from the yth line by (N−m)/2N.

2. An image reading apparatus comprising:

an optical unit adapted to focus an optical image of an original;

an image sensor for linearly arranging pluralities of photoelectric-conversion pixels, accumulating a linear optical image focused by said optical unit in said photoelectric-conversion pixels as signal electric charges, and successively outputting said signal electric charges as image signals every predetermined period;

a scanning unit adapted to scan said original in a sub-scanning direction vertical to a main scanning direction serving as the direction of said linear optical image; and a pixel-shifting unit adapted to shift the relative positions between the position of an optical image focused on said image sensor through said optical unit and said photoelectric-conversion pixels on the unit basis of substantially 1/N (N is an integer) of the pixel pitch of said image sensor in said main scanning direction;

wherein the sub-scanning-directional moving distance of said scanning unit at every repetition cycle of a line sequential signal output from said image sensor is made equal to substantially 1/N of the pitch between pixels of said image sensor and pixel shifting is performed on the unit basis of 1/N of the pitch between pixels of said image sensor; and, when expressing an optional pixel of an optional line sequential signal as the xth pixel from the end in a predetermined main scanning direction in an image reading range on the yth line from the end in a predetermined sub-scanning direction in the image reading range, the pixel data at a position between the xth and (x+1)th pixels on the yth line and shifted by k/N (k is an integer and k_<N−1) of the pitch between pixels from the xth pixel is generated by adding such four pixel data values as a value obtained by multiplying the xth pixel data by (N−k)/2, a value obtained by multiplying the (x+1)th pixel data by k/2N, a value obtained by multiplying the xth pixel data on the (y+k)th line serving as a main scanning line at a position shifted by k/N the pitch between pixels from said main scanning line in main scanning direction and sub-scanning direction by (N−k)/2, and a value obtained by multiplying the xth pixel data on the (y+k−N)th line by k/2N.

3. An image reading method comprising the steps of:

outputting an image signal corresponding to a linear optical image every certain period by picking up an optical image of an original focused by an optical unit with a linear image sensor constituted by linearly arranging pluralities of photoelectric-conversion pixels; and shifting the relative positions between the position of the optical image focused on said linear image sensor through said optical unit and said photoelectric-conversion pixels on the unit basis of substantially 1/N (N is an integer) of the pixel pitch of said linear image sensor in a main scanning direction whenever sub-scanning is performed in order to scan said original in the direction vertical to a main scanning direction serving as the direction of said linear optical image;

wherein, when N repetitions of said sub-scanning are performed, pixel shifting is performed on the unit basis of substantially 1/N of the pitch between pixels of said linear image sensor for each sub-scanning; and wherein the moving distance in said sub-scanning direction is made substantially equal to the pitch between pixels of said linear image sensor at every repetition cycle of a line sequential signal output from said linear image sensor and the position of the optical image of each of said line sequential signals focused on said linear image sensor through said N repetitions of scanning is shifted in the sub-scanning direction by a value equivalent to substantially 1/N of the pitch between pixels of said image sensor.

4. The image reading method according to claim 3, wherein, when expressing an optional pixel at any scanning as the xth pixel from the end in a predetermined main scanning direction in the image reading range on the yth line from the end in a predetermined sub-scanning direction in the image reading range, the pixel data at a position between the xth pixel and the (x+1)th pixel on the yth line and shifted from the xth pixel by k/N (k is an integer and k≦N−1) of the pitch between pixels is generated by adding such four pixel data values as a value obtained by multiplying the xth pixel data by (N−k)/2N, a value obtained by multiplying the (x+1)th pixel data by k/2N, a value obtained by multiplying the pixel data at a position shifted from the end in said predetermined sub-scanning direction by k/N of the pitch between pixels from the (y−1)th line in a sub-scanning direction and moreover shifted from the end in said predetermined main scanning direction by k/N of the pitch between pixels in a main scanning direction from the xth pixel by k/2N at the scanning at a position shifted by k/N of the pitch between pixels from the position at the above scanning in main scanning direction and sub-scanning direction, and a value obtained by multiplying the pixel data at a position shifted by k/N of the pitch between pixels in a sub-scanning direction from the yth line and shifted by k/N of the pitch between pixels in a main scanning direction from the xth pixel by (N−k)/2N, and the data at a position between the xth pixels on the yth line and the (y+1)th line and shifted from the pixel on the yth line by m/N (m is an integer and m≦N−1) of the pitch between pixels is generated by adding such four pixel data values as a value obtained by multiplying the pixel data on the yth line by (N−m)/N, a value obtained by multiplying the pixel data on the (y+1)th line by m/N, a value obtained by multiplying the pixel data at a position shifted by m/N of the pixel pitch in a main scanning direction form the (x−1)th pixel and shifted by m/N of the pitch between pixels in a sub-scanning direction from the yth line at the scanning at a position shifted by m/N of the pixel pitch from the case of the above scanning in main scanning direction and sub-scanning direction by m/2N, and a value obtained by multiplying the pixel data at a position shifted by m/N of the pitch between pixels in a main scanning direction from the xth pixel and shifted by m/N of the pitch between pixels in a sub-scanning direction from the yth line by (N−m)/2N.

5. An image reading method comprising the steps of:

outputting an image signal corresponding to a linear optical image every certain period by picking up an optical image of an original focused by an optical unit with a linear image sensor constituted by linearly arranging pluralities of photoelectric-conversion pixels; and shifting the relative positions between the position of the optical image focused on said linear image sensor through said optical unit and said photoelectric-conversion pixels on the unit basis of substantially 1/N (N is an integer) the pixel pitch of said linear image sensor in a main scanning direction whenever sub-scanning is performed in order to scan said original in the direction vertical to a main scanning direction serving as the direction of said linear optical image;

wherein the sub-scanning-directional moving distance at every repetition cycle of a line sequential signal output from said image sensor is made equal to substantial 1/N of the pitch between pixels of said image sensor and pixel shifting on the unit basis of substantially 1/N of the pitch between pixels of said image sensor is performed at every repetition cycle of said line sequential signal; and wherein said image sensor has a sweeping-away unit adapted to sweep away the signal electric charges accumulated in said photoelectric-conversion pixels instead of outputting them as line sequential signals and the signal electric charges accumulated in said photoelectric-conversion pixels are swept away by said sweeping-away unit while the position of an optical image moves relatively to said photoelectric-conversion pixels when performing pixel shifting on the unit basis of substantially 1/N of the pitch between pixels of said image sensor.

6. An image reading method comprising the steps of:

outputting an image signal corresponding to a linear optical image every certain period by picking up an optical image of an original focused by an optical unit with a linear image sensor constituted by linearly arranging pluralities of photoelectric-conversion pixels; and shifting the relative positions between the position of the optical image focused on said linear image sensor through said optical unit and said photoelectric-conversion pixels on the unit basis of substantially 1/N (N is an integer) of the pixel pitch of said linear image sensor in a main scanning direction whenever sub-scanning is performed in order to scan said original in the direction vertical to a main scanning direction serving as the direction of said linear optical image;

wherein the sub-scanning-directional moving distance at every repetition cycle of a line sequential signal output from said image sensor is made equal to substantial 1/N of the pitch between pixels of said image sensor and pixel shifting on the unit basis of substantially 1/N of the pitch between pixels of said image sensor is performed at every repetition cycle of said line sequential signal; and, wherein when expressing an optional pixel of an optional line sequential signal as the xth pixel from the end in a predetermined main scanning direction in an image-reading range on the yth line from the end in a predetermined sub-scanning direction in the image-reading range, the pixel data at a position between the xth and (x+1)th pixels on the yth line and shifted by k/N (k is an integer and k-_<N−1) of the pitch between pixels from the xth pixel is generated by adding such four pixel data values as a value obtained by multiplying the xth pixel data by (N−k)/2, a value obtained by multiplying the (x+1)th pixel data by k/2N, a value obtained by multiplying the xth pixel data on the (y+k)th line serving as the main scanning line at a position shifted from the main scanning line by k/N of the pitch between pixels in main scanning direction and sub-scanning direction by (N−k)/2, and a value obtained by multiplying the xth pixel data on the (y+k−N)th line by k/2N.

7. A storage medium storing an image-reading program, said program comprising steps of picking up an optical image of an original focused by an optical unit with an image sensor constituted by linearly arranging pluralities of photoelectric-conversion pixels to successively output image signals corresponding to linear optical images as image signals every certain period, scanning the surface of said original a plurality of times in a sub-scanning direction vertical to a main scanning direction serving as the direction of said linear reflected optical images, and shifting the relative positions between the position of an optical image focused on said image sensor through said optical unit and said photoelectric-conversion pixels on the unit basis of substantially 1/N (N is an integer) of the pitch between pixels of said image sensor in said main scanning direction at every scannings of the plurality of times;

wherein an image-reading program is stored which performs N repetitions of said sub-scanning, and respective pixel shifting on the unit basis of substantially 1/N of the pitch between pixels of said linear image sensor by said pixel shifting unit; an image-reading program is stored which makes the distance of the sub-scanning performed every repetition cycle of a line sequential signal output from said linear image sensor substantially equal to the pitch between pixels of said linear image sensor and shifts the position of the optical image of each of said line sequential signals focused on said linear image sensor through said N repetitions of scanning in a sub-scanning direction by a value substantially equivalent to 1/N of the pitch between pixels of said linear image sensor; and an image-reading program is stored which, when expressing an optional pixel at any scanning as the xth pixel from the end in a predetermined main scanning direction in an image reading range on the yth line from the end in a predetermined sub-scanning direction in the image reading range, generates the pixel data at a position between the xth pixel and the (x+1)th pixel on the yth line and shifted from the xth pixel by k/N (k is an integer and k_<N−1) of the pitch between pixels by adding such four pixel data values as a value obtained by multiplying the xth pixel data by (N−k)/2N, a value obtained by multiplying the (x+1)th pixel data by k/2N, a value obtained by multiplying the pixel data at a position shifted from the end in said predetermined sub-scanning direction by k/N the pitch between pixels from the (y−1)th line in a sub-scanning direction and moreover shifted from the end in said predetermined main scanning direction by k/N the pitch between pixels in a main scanning direction from the xth pixel by k/2N at the scanning at a position shifted by k/N the pitch between pixels from the position at the above scanning in main scanning direction and sub-scanning direction, and a value obtained by multiplying the pixel data at a position shifted by k/N the pitch between pixels in a sub-scanning direction from the yth line and shifted by k/N the pitch between pixels in a main scanning direction from the xth pixel by (N−k)/2N, and generates the data at a position between the xth pixels on the yth line and the (y+1)th line and shifted from the pixel on the yth line by m/N (m is an integer and m<_N−1) of the pitch between pixels by adding such four pixel data values as a value obtained by multiplying the pixel data on the yth line by (N−m)/N, a value obtained by multiplying the pixel data on the (y+1)th line by m/N, a value obtained by multiplying the pixel data at a position shifted by m/N of the pixel pitch in a main scanning direction from the (x−1)th pixel and shifted by m/N of the pitch between pixels in a sub-scanning direction from the yth line at the scanning at a position shifted by m/N of the pixel pitch from the case of the above scanning in main scanning direction and sub-scanning direction by m/2N, and a value obtained by multiplying the pixel data at a position shifted by m/N of the pitch between pixels in a main scanning direction from the xth pixel and shifted by m/N of the pitch between pixels in a sub-scanning direction from the yth line by (N−m)/2N.

8. A storage medium storing an image-reading program, said program comprising steps of picking up an optical image of an original focused by an optical unit with an image sensor constituted by linearly arranging pluralities of photoelectric-conversion pixels to successively output image signals corresponding to linear optical images as image signals every certain period, scanning the surface of said original a plurality of times in a sub-scanning direction vertical to a main scanning direction serving as the direction of said linear reflected optical images, and shifting the relative positions between the position of an optical image focused on said image sensor through said optical unit and said photoelectric-conversion pixels on the unit basis of substantially 1/N (N is an integer) of the pitch between pixels of said image sensor in said main scanning direction at every scannings of the plurality of times;

wherein said image-reading program further comprising a step of, when expressing an optional pixel of an optional line sequential signal as the xth pixel from the end in a predetermined main scanning direction in an image-reading range on the yth line from the end in a predetermined sub-scanning direction in the image-reading range.

9. An image reading apparatus comprising:

an image sensor constituted by linearly arranging pluralities of photoelectirc-conversion pixels;

a scanning unit adapted to scan an original in a sub-scanning direction vertical to a main scanning direction serving as the direction of a linear optical image incoming to said image sensor;

a pixel shifting unit adapted to shift the relative postions between the position of an optical image focused on said image sensor and said photoelectric-conversion pixels by substantially ½ of the pixel pitch of said image sensor in said main scanning direction;

a control unit adapted to control said scanning unit and said pixel shifting unit, performing sub-scanning two times by said scanning unit, and performing pixel shifting on the unit basis of substantially ½ of the pixel pitch of said image sensor by said pixel shifting unit for each sub-scanning to read an image; and an image-signal generating unit adapted to generate image signals in accordance with pluralities of pixel data values obtained through operations of said pixel shifting unit and said scanning unit;

wherein said image-signal generating unit is constituted to makes the sub-scanning-directional moving distance of said scanning unit at every repetition cycle of said line sequential image signal substantially equal to the pixel pitch of said image sensor and shift the position of the optical image of each line sequential image signal focused on said image sensor through said two repetitions of sub-scanning by a value substantially equivalent to ½ the pixel pitch of said image sensor in a sub-scanning direction, when an optional pixel at each time of said sub-scanning is expressed as the xth pixel from the end in a main scanning direction in a predetermined image reading range on the yth line from the end in a sub-scanning direction in said predetermined image reading range and the read position of the xth pixel on the yth line at the first-time sub-scanning is present at a position shifted by substantial ½ of a pixel pitch in main scanning direction and sub-scanning direction from the read position of the xth pixel on the yth line at the second-time sub-scanning, generate the average value between the xth pixel data on the yth line at said first-time sub-scanning and the xth pixel data on the yth line at said second-time sub-scanning as the new 2xth pixel data on the 2yth line, generate the average value between the xth pixel data on the yth line at the first-time sub-scanning and the (x−1)th pixel data on the yth line at the second-time sub-scanning as the new (2x−1)th pixel data on the 2yth line, generate the average value between the xth pixel data on the yth line at the first-time sub-scanning and the xth pixel data on the (y−1)th line at the second-time scanning as the new 2xth pixel data on the (2y−1)th line, and generage the average value between the xth pixel data on the yth line at the first-time sub-scanning and the (x−1)th pixel data on the (y−1)th line at the second-time sub-scanning as the new (2x−1)th pixel data on the (2y−1)th line.

10. The image reading apparatus according to claim 9, wherein said first-time sub-scanning direction and said second-time sub-scanning direction are opposite to each other.

11. An image reading apparatus comprising:

an image sensor constituted by linearly arranging pluralities of photoelectric-conversion pixels to accumulate incoming linear optical images in said photoelectric-conversion pixels as signal electric charges and output them as line sequential image signals at every predetermined period;

a scanning unit adapted to scan an original in a sub-scanning direction vertical to a main scanning direction serving as the direction of a linear optical image incoming to said image sensor;

a pixel shifting unit adapted to shift the relative positions between the position of an optical image focused on said image sensor on one hand and said photoelectric-conversion pixels on the other in said main scanning direction by substantially ½ of the pixel pitch of said image sensor;

a control unit adapted to control said scanning unit and said pixel shifting unit to set the moving distance of said scanning unit in said sub-scanning direction at substantially ½ of the pixel pitch of said image sensor at every repetition cycle of said line sequential signal and cause said pixel shifting unit to perform the pixel shifting of ½ of the pixel pitch of said image sensor at every repetition cycle of said line sequential signal; and an image-signal generating unit adapted to generate an image signal by synthesizing pluralities of pixel data values obtained through the operations of said control pixel shifting unit and said scanning unit; wherein said image-signal generating unit is constituted to, when an optional pixel is expressed as the xth pixel from the end in the main scanning direction in a predetermined image reading range on the yth line from the end in the sub-scanning direction in said predetermined image reading range and the read position of the xth pixel on the (y+1)th line is present at a position shifted from the read position of the xth pixel on the yth line by substantially ½ of said pixel pitch in said sub-scanning direction and sub-scanning direction, generate the average value between the xth pixel data on the yth line and the xth pixel data on the (y+1)th line as the new xth pixel data on the yth line, generate the average value between the xth pixel data on the yth line and the (x−1)th pixel data on the (y+1)th line as the new (x−1)th pixel data on the yth line, generate the average value between the xth pixel data on the yth line and the xth pixel data on the (y−1)th line as the new xth pixel data on the (y−1)th line, and generate the average value between the xth pixel data on the yth line and the (x−1)th pixel data on the (y−1)th line as the new (x−1)th pixel data on the (y−1)th line as the new (x−1)th pixel data on the (y−1)th line.

12. The image reading apparatus according to claim 9 or 11, wherein said pixel shifting unit is constituted with a light-refracting plate set between an original table for mounting said original and said image sensor and an angle changing unit adapted to change the angles of said light-refracting plate from an optical axis.

13. The image reading apparatus according to claim 9 or 11, wherein said pixel shifting unit moves said image sensor in the main scanning direction.

14. The image reading apparatus according to claim 9 or 11, further comprising an original table for mounting an original, wherein said pixel shifting unit moves said original table or original in a main scanning direction.

15. The image reading apparatus according to claim 9, wherein said image sensor has a sweeping-away unit adapted to sweep away the signal electric charges accumulated in said photoelectric-conversion pixel instead of outputting them as line sequential image signals and the signal electric charges accumulated in said photoelectric-conversion pixels are swept away by said sweeping-away unit while the position of an optical image moves relatively to said photoelectric-conversion pixels when performing the pixel shifting of substantially ½ of the pixel pitch of said image sensor.

16. A method for controlling an image reading apparatus provided with an image sensor constituted by linearly arranging a plurality of photoelectric-conversion pixels, a scanning unit adapted to scan an original in a sub-scanning direction vertical to a main scanning direction serving as the direction of a linear optical image incoming to said image sensor, and a pixel shifting unit adapted to shift the relative positions between the position of an optical image focused on said image sensor and said photoelectric-conversion pixels in said sub-scanning direction by substantially ½ of the pixel pitch of said image sensor, the method comprising the steps of:

when performing sub-scanning twice by said scanning unit and performing the pixel shifting on the unit basis of substantially ½ of the pixel pitch of said image sensor by said pixel shifting unit for each sub-scanning, setting the sub-scanning-directional moving distance of said scanning unit at every repetition cycle of said line sequential image signal substantially to the pixel pitch of said image sensor and shifting respective positions of the optional images of said line sequential image signals focused on said image sensor through said two repetitions of sub-scanning by a value substantially equivalent to ½ of the pixel pitch of said image sensor;

when an optional pixel at each of said two repetitions of sub-scanning is expressed as the xth pixel from the end in a main scanning direction in a predetermined image reading range on the yth line from the end in a sub-scanning direction in said predetermined image reading range and when the read position of the xth pixel on the yth line at the second-time sub-scanning is present at a position shifted by substantially ½ of the pixel pitch in the main scanning direction and sub-scanning direction, generating the average value between the xth pixel data on the yth line at the first-time sub-scanning and the xth pixel data on the yth line at the second-time sub-scanning as the new 2xth pixel data on the 2yth line;

generating the average value between the xth pixel data on the yth line at the first-time sub-scanning and the (x−1)th pixel data on the yth line at the second-time scanning as the new (2x−1)th pixel data on the 2yth line;

generating the average value between the xth pixel data on the yth line at the first line sub-scanning and the xth pixel data on the (y−1)th line at the second-time sub-scanning as the new 2xth pixel data on the (2y−1)th line; and generating the average value between the xth pixel data on the yth line at the first-time sub-scanning and the (x−1)th pixel data on the (y−1)th line at the second-time sub-scanning as the new (2x−1)th pixel data on the (2y−1)th line thereby, generating an image signal.

17. The image reading method according to claim 16, wherein the direction of second-time sub-scanning is made opposite to the direction of first-time sub-scanning.

18. An image reading method for controlling an image reading apparatus provided with an image sensor constituted by linearly arranging a plurality of photoelectric-conversion pixels to accumulate incoming linear optical images in said photoelectric-conversion pixels as signal electric charges and output them every certain period as line sequential image signals, a scanning unit adapted to scan an original in a sub-scanning direction vertical to a main scanning direction serving as the direction of a linear optical image incoming to said image sensor, and a pixel shifting unit adapted to shift the relative positions between the position of an optical image focused on said image sensor on one hand and said photoelectric-conversion pixels on the other in said main scanning direction by substantially ½ of the pixel pitch of said image sensor, the method comprising the steps of:

controlling said scanning unit and said pixel shifting unit to set the sub-scanning-directional moving distance of said scanning unit at every repetition cycle of said line sequential image signal to substantially ½ of the pixel pitch of said image sensor and cause said pixel shifting unit to perform the pixel shifting of ½ of the pixel pitch of said image sensor at every repetition cycle of said line sequential image signal;

when an optional pixel in a plurality of pixel data values obtained thought operations of said scanning unit and pixel shifting unit is expressed as the xth pixel from the end in a main scanning direction in a predetermined image reading range on the yth line from the end in a sub-scanning direction in said predetermined image reading range and when the read position of the xth pixel on the (y+1)th line is present at a position shifted by substantially ½ of the pixel pitch from the read position of the xth pixel on the yth line in the main scanning direction and sub-scanning direction, generating the average value between the xth pixel data on the yth line and the xth pixel data on the (y+1)th line as the new xth pixel data on the yth line;

generating the average value between the xth pixel data on the yth line and the (x−1)th pixel data on the (y+1)th line as the new (x−1)th pixel data on the yth line;

generating the average value between the xth pixel data on the yth line and the xth pixel data on the (y−1)th line as the new xth pixel data on the (y−1)th line, and generating the average value between the xth pixel data on the yth line and the (x−1)th pixel data on the (y−1)th line as the new (x−1)th pixel data on the (y−1)th line.

* * * * *

UNITED STATES PATENT AND TRADEMARK OFFICE
CERTIFICATE OF CORRECTION

PATENT NO. : 6,567,189 B1
DATED : May 20, 2003
INVENTOR(S) : Tsutomu Takayama et al.

It is certified that error appears in the above-identified patent and that said Letters Patent is hereby corrected as shown below:

Column 2,
Line 31, "provide a" should read -- provide --; and
Line 54, "to an" should read -- to --.

Column 3,
Line 39, "substantial" should read -- substantially --; and
Line 43, "sifted" should read -- shifted --.

Column 6,
Line 27, "above described as very-minute" should read -- described above as very minute --; and
Line 57, "lines," should read -- line, --.

Column 9,
Line 33, "to." should read -- to --.

Column 10,
Line 15, "attenuate" should read -- attenuates --; and
Line 22, "having;a" should read -- having a --.

Column 11,
Line 35, "ling" should read -- line --.

Column 12,
Line 3, "up,to" should read -- up to --.

Column 13,
Line 23, ";in" should read -- , in --.

Column 14,
Line 28, "substantial" should read -- substantially --; and
Line 36, "stantial" should read -- stantially --.

Column 15,
Line 5, "ling" should read -- line --.
Lines 10 and 12, "substantial" should read -- substantially --; and
Line 26, "line.which" should read -- line which --; and
Line 65, "our" should read -- four --.

UNITED STATES PATENT AND TRADEMARK OFFICE
CERTIFICATE OF CORRECTION

PATENT NO. : 6,567,189 B1
DATED : May 20, 2003
INVENTOR(S) : Tsutomu Takayama et al.

It is certified that error appears in the above-identified patent and that said Letters Patent is hereby corrected as shown below:

Column 17,
Line 17, "superimposed" should read -- superimposed on --.

Column 20,
Line 21, "more-minute" should read -- more minute --.

Column 21,
Line 7, "very-minute" should read -- very minute --; and
Line 57, "k<_N-1" should read -- k≤N-1) --.

Column 22,
Line 12, "m<_N-1" should read -- m≤N-1) --; and
Line 63, "k_<N-1" should read -- k≤N-1) --.

Column 25,
Line 18, "k-_<N-1" should read -- k≤N-1) --; and
Line 44, "scannings" should read -- scanning --.

Column 26,
Line 2, "k_<N-1)" should read -- k≤N-1) --;
Line 24, "m<_N-1)" should read -- m≤N-1) --;
Line 56, "scannings" should read -- scanning --;
Line 63, "range." should read -- range, ¶generating the pixel data at position between the xth pixel and the (x+1)th pixel on the yth line and shifted by k/N (k is an integer and k≤N-1) of the pitch between pixels from the xth pixel adding such four pixel data values as a value obtained by multiplying the xth pixel data by (N-k)/2, a value obtained by multiplying the (x+1)th pixel data by k/2N, a value obtained by multiplying the xth pixel data on the (y+k)th line serving as a main scanning line at a position shited from the main scanning line by k/N of the pitch between pixels in main scanning direction and sub-scanning directionby (N-K)/2, and a value obtained by mutiplying the xth pixel data on the (y+k-N)th line by k/2. --; and
Line 65, "photoelectirc-conversion" should read -- photoelectric-conversion --.

UNITED STATES PATENT AND TRADEMARK OFFICE
CERTIFICATE OF CORRECTION

PATENT NO. : 6,567,189 B1
DATED : May 20, 2003
INVENTOR(S) : Tsutomu Takayama et al.

It is certified that error appears in the above-identified patent and that said Letters Patent is hereby corrected as shown below:

<u>Column 27,</u>
Line 19, "makes" should read -- make --; and
Line 36, "substantial" should read -- substantially --.

Signed and Sealed this

Twentieth Day of January, 2004

JON W. DUDAS
*Acting Director of the United States Patent and Trademark Office*